United States Patent
Miyata et al.

(10) Patent No.: US 7,925,810 B2
(45) Date of Patent: Apr. 12, 2011

(54) DATA STORAGE SYSTEM, METHOD, AND RECORDING MEDIUM THAT SIMULTANEOUSLY TRANSMITS DATA THAT WAS SEPARATELY GENERATED FROM PLURAITY OF TRANSFER UNITS TO SAME DATA LOCATION

(75) Inventors: Michitaro Miyata, Tokyo (JP); Yoshihiro Kajiki, Tokyo (JP); Yoshihiro Hasebe, Tokyo (JP)

(73) Assignee: NEC Corporation, Tokyo (JP)

( * ) Notice: Subject to any disclaimer, the term of this patent is extended or adjusted under 35 U.S.C. 154(b) by 161 days.

(21) Appl. No.: 11/649,846

(22) Filed: Jan. 5, 2007

(65) Prior Publication Data

US 2007/0198784 A1 Aug. 23, 2007

(30) Foreign Application Priority Data

Feb. 16, 2006 (JP) ................................. 2006-039219

(51) Int. Cl.
*G06F 13/00* (2006.01)
*G06F 12/00* (2006.01)

(52) U.S. Cl. ..................... 710/74; 710/8; 710/9; 710/10; 710/72; 710/73; 710/301; 711/154; 711/111; 711/112; 711/162; 714/7; 709/213; 709/203; 709/200

(58) Field of Classification Search ................. 710/8–10, 710/72–74, 301; 711/162, 165, 167, 114, 711/111, 112, 154; 709/200, 203, 213
See application file for complete search history.

(56) References Cited

U.S. PATENT DOCUMENTS

| | | | | |
|---|---|---|---|---|
| 5,740,397 A | * | 4/1998 | Levy | 711/114 |
| 6,212,607 B1 | * | 4/2001 | Miller et al. | 711/149 |
| 6,629,195 B2 | * | 9/2003 | Schroeder et al. | 711/108 |
| 6,901,454 B2 | * | 5/2005 | Higaki et al. | 710/5 |
| 7,073,090 B2 | * | 7/2006 | Yanai et al. | 714/7 |
| 7,120,673 B2 | * | 10/2006 | Kitamura et al. | 709/213 |
| 7,325,109 B1 | * | 1/2008 | Muppalaneni et al. | 711/162 |
| 7,406,577 B2 | * | 7/2008 | Kaneda et al. | 711/165 |
| 7,457,899 B2 | * | 11/2008 | Ohno et al. | 710/74 |
| 2003/0051111 A1 | * | 3/2003 | Nakano et al. | 711/162 |
| 2004/0064658 A1 | * | 4/2004 | Chang | 711/162 |
| 2005/0149683 A1 | * | 7/2005 | Chong et al. | 711/162 |
| 2005/0289218 A1 | * | 12/2005 | Rothman et al. | 709/203 |
| 2006/0149901 A1 | * | 7/2006 | Sasage et al. | 711/114 |
| 2007/0011423 A1 | * | 1/2007 | Kaneda et al. | 711/165 |
| 2007/0079099 A1 | * | 4/2007 | Eguchi | 711/170 |

FOREIGN PATENT DOCUMENTS

| | | |
|---|---|---|
| JP | 2003-167684 | 6/2003 |
| JP | 2005-190456 | 7/2005 |
| JP | 2005-267216 | 9/2005 |

OTHER PUBLICATIONS

David A. Patterson, Garth Gibson, and Randy H. Iatz, A Case for Redundant Arrays of Independent Disks (RAID).

"Introductory technical description of database systems—from basics to technical details", written by Makoto Takizawa, Kabushiki Kaisha Soft Research Center, $1^{st}$ print on Mar. 1, 1991, p. 188-197.

* cited by examiner

*Primary Examiner* — Tammara Peyton
(74) *Attorney, Agent, or Firm* — Young & Thompson

(57) ABSTRACT

A data storage system has a first storage unit and a second storage unit for storing the same data received from a plurality of higher-level devices. The first storage unit transmits sequence information representative of a sequence for storing the data received from the higher-level devices, to said second storage unit.

33 Claims, 14 Drawing Sheets

Fig.7A write command a

| start address | data length |
|---|---|
| 200h | 40h | write command b

| start address | data length |
|---|---|
| 200h | 40h |

Fig.7B write command a'

| command identifier | start address | data length |
|---|---|---|
| 1-0010 | 200h | 40h | write command b'

| command identifier | start address | data length |
|---|---|---|
| 2-0005 | 200h | 40h |

Fig.7C sequence information a

| command identifier | execution sequence |
|---|---|
| 1-0010 | 1 | sequence information b

| command identifier | execution sequence |
|---|---|
| 2-0005 | 2 |

Fig.7D

| command identifier | start address | data length | data | execution sequence |
|---|---|---|---|---|
| .. | .. | .. | .. | .. |
| 2-0005 | 200h | 40h | (keep sector 40h) | (keep area) |

Fig.7E

| command identifier | start address | data length | data | execution sequence |
|---|---|---|---|---|
| .. | .. | .. | .. | .. |
| 2-0005 | 200h | 40h | (keep sector 40h) | (keep area) |
| 1-0010 | 200h | 40h | (keep sector 40h) | (keep area) |

Fig.7F

| command identifier | start address | data length | data | execution sequence |
|---|---|---|---|---|
| .. | .. | .. | .. | .. |
| 2-0005 | 200h | 40h | (keep sector 40h) | 2 |
| 1-0010 | 200h | 40h | (keep sector 40h) | 1 |

Fig.7G

| command identifier | start address | data length | data | execution sequence |
|---|---|---|---|---|
| .. | .. | .. | .. | .. |
| 2-0005 | 200h | 40h | data b | 2 |
| 1-0010 | 200h | 40h | data a | 1 |

Fig.9A structure of data set
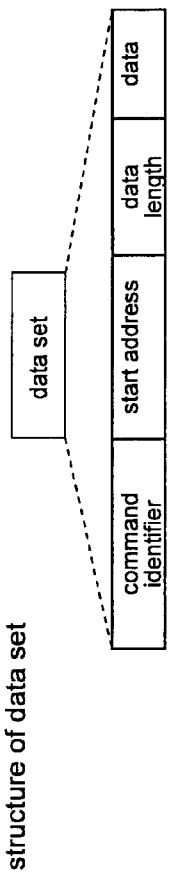
Fig.9B sequence undetermined link
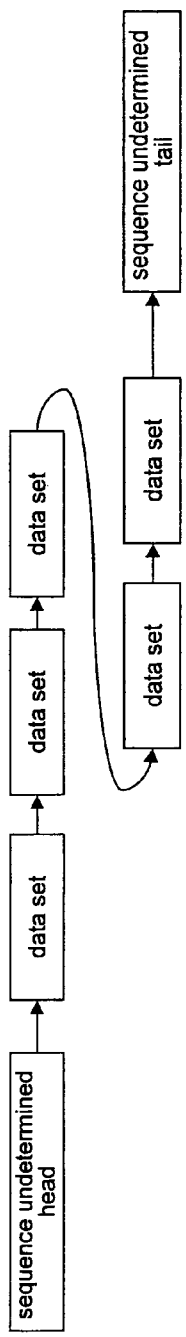
Fig.9C sequence information queue
Fig.9D sequence determined link
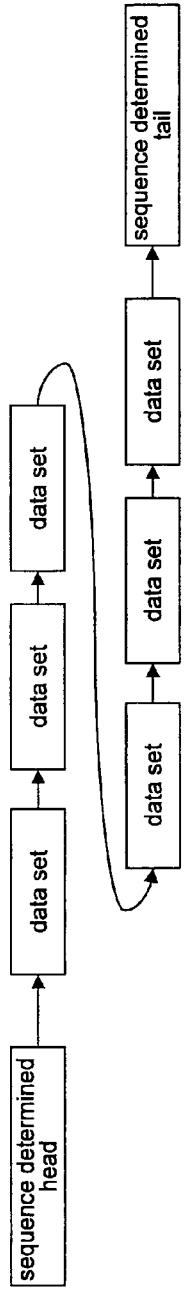

Fig.10A write command a

| start address | data length |
|---|---|
| 200h | 40h | write command b

| start address | data length |
|---|---|
| 200h | 40h |

Fig.10B write command a'

| command identifier | start address | data length |
|---|---|---|
| 1-0010 | 200h | 40h | write command b'

| command identifier | start address | data length |
|---|---|---|
| 2-0005 | 200h | 40h |

Fig.10C sequence information a

| command identifier |
|---|
| 1-0010 | sequence information b

| command identifier |
|---|
| 2-0005 |

Fig.10D
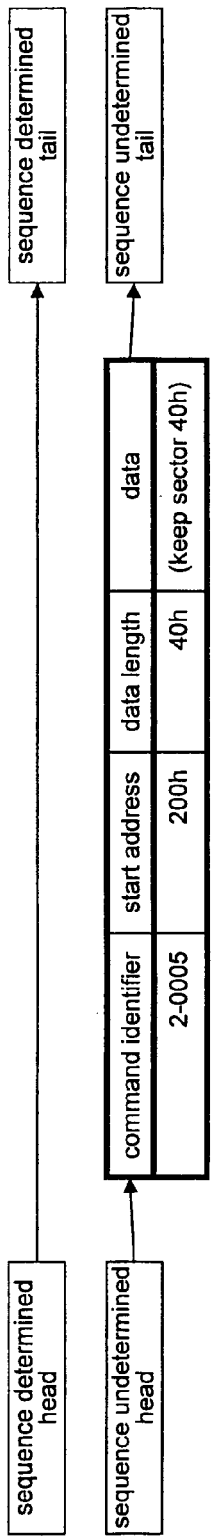
Fig.10E
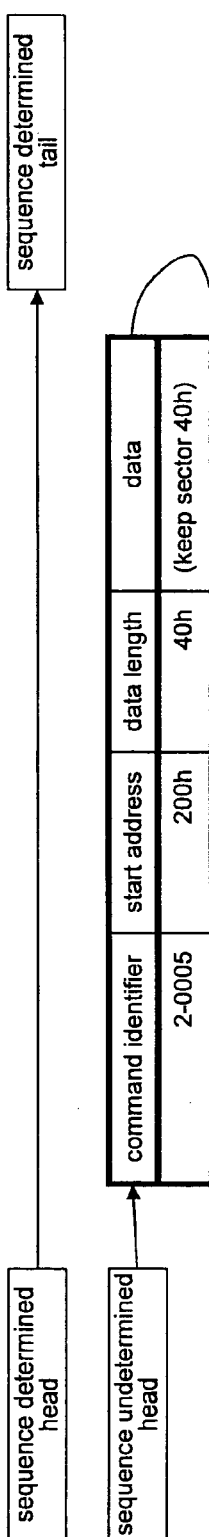
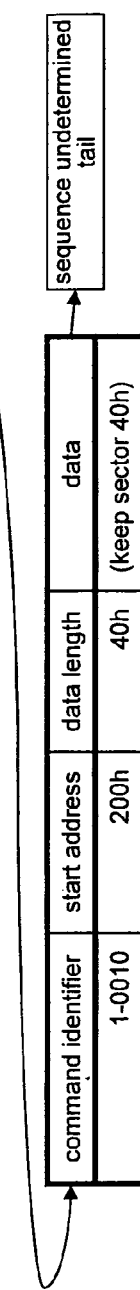
Fig.10F
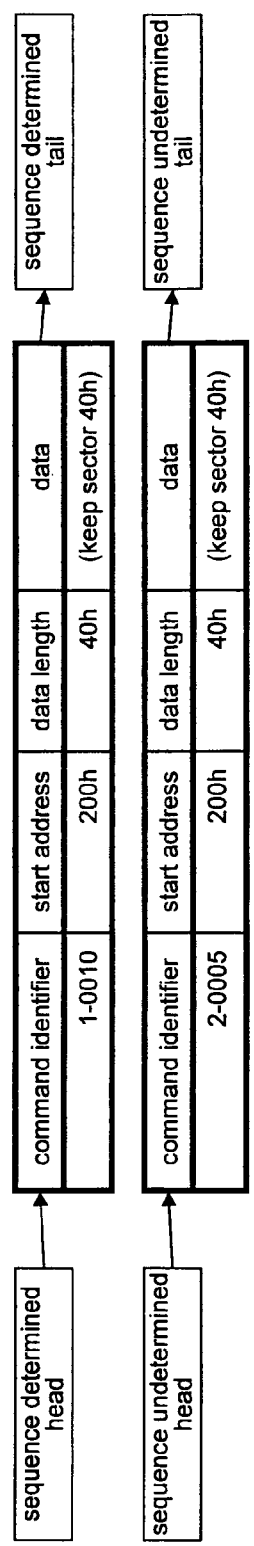

DATA STORAGE SYSTEM, METHOD, AND RECORDING MEDIUM THAT SIMULTANEOUSLY TRANSMITS DATA THAT WAS SEPARATELY GENERATED FROM PLURAITY OF TRANSFER UNITS TO SAME DATA LOCATION

This application is based upon and claims the benefit of priority from Japanese Patent Application No. 2006-039219 filed on Feb. 16, 2006, the content of which is incorporated herein by reference.

BACKGROUND OF THE INVENTION

1. Field of the Invention

The present invention relates to a data storage system, a data storing method, and a recording medium for storing the same data in a plurality of storage units.

2. Description of the Related Art

Heretofore, it has been customary for a data storage system to duplicate the same data by storing the data in a plurality of storage units for the purpose of preventing the data from being lost in the event of a system fault. FIG. 1 of the accompanying drawings shows a data storage system in which data transfer unit 31 receives data from a higher-level device 33 and transfers the received data simultaneously to a plurality of storage units 32a, 32b, so that the same data is stored in the storage units 32a, 32b. Such a data duplicating process is referred to as mirroring. The mirroring performed between hard disks is known as RAID1 (Redundant Arrays of Independent Disks 1, see Non-patent document 1).

Non-patent document 1: David A. Patterson, Garth Gibson, and Randy H. Katz, A Case for Redundant Arrays of Independent Disks (RAID).

Since the mirroring process transfers data simultaneously to a plurality of storage units, it is advantageous in that even when duplicated data are generated, i.e., when both storage units 32a, 32b are available, the time for responding to higher-level device 33 remains the same as when duplicated data not generated, i.e., when only one of storage units 32a, 32b is available.

FIG. 2 of the accompanying drawings shows another data storage system wherein a plurality of data transfer units 41a, 41b and a plurality of storage units 42a, 42b are interconnected by communication network 44. In the data storage system shown in FIG. 2, data transfer units 41a, 41b may attempt to access one storage unit. In such a case, according to the mirroring process for simply transferring data to a plurality of storage units, a data inconsistency may occur between the storage units. For example, such a data inconsistency occurs in a situation shown below.

It is assumed that data transfer unit 41a attempts to write data "a" received from higher-level device 43a and data transfer unit 41b attempts to write data "b" received from higher-level device 43b substantially at the same time in storage units 42a, 42b at the same addresses. In this case, data "a" may arrive at storage unit 42a earlier than data "b" and data "b" may arrive at storage unit 42b earlier than data "a" due to a delay caused by communication network 44. If data "a", "b" arrive at storage units 42a, 42b at different times, as described above, then since the earlier data is overwritten by the later data, storage unit 42a stores data "b" and storage unit 42b stores data "a". As a consequence, no data consistency is present between storage units 42a, 42b.

For a mirroring process to be performed with respect to a plurality of higher-level devices, there is known a process called two-phase locking to be performed for keeping data consistent between storage units (see Non-patent document 2).

Non-patent document 2: "Introductory technical description of database systems—from basics to technical details", written by Makoto Takizawa, Kabushiki Kaisha Soft Research Center, 1st print on Mar. 1, 1991, p. 188-197

In the system configuration shown in FIG. 2, when data transfer unit 41a is to write data in storage units 42a, 42b, data transfer unit 41a first locks storage unit 42a, so that other data transfer unit 41b cannot write data in storage unit 42a and cannot lock storage unit 42a. Then, data transfer unit 41a first locks storage unit 42b, so that other data transfer unit 41b cannot write data in storage unit 42b and cannot lock storage unit 42b. Thereafter, data transfer unit 41a writes data in storage unit 42a and storage unit 42b. After having written the data in storage unit 42a and storage unit 42b, data transfer unit 41a unlocks storage units 42a, 42b. When data transfer unit 41b is to write data in storage units 42a, 42b, data transfer unit 41b follows the same process as described above.

It is assumed in the two-phase locking process that data transfer unit 41a attempts to write data "a" received from higher-level device 43a and data transfer unit 41b attempts to write data "b" received from higher-level device 43b substantially at the same time in storage units 42a, 42b at the same addresses. Both data transfer units 41a, 41b attempt to lock storage unit 42a. If data transfer unit 41a locks storage unit 42a earlier than data transfer unit 41b, then data transfer unit 41a locks storage unit 42b, writes data "a" in storage units 42a, 42b, and thereafter unlocks storage units 42a, 42b. Data transfer unit 41b is unable to lock storage unit 42a until data transfer unit 42a unlocks storage unit 42a. Consequently, after transfer unit 42a unlocks storage unit 42a, data transfer unit 41b locks storage unit 42a and then locks storage unit 42b, writes data "b" in storage units 42a, 42b, and thereafter unlocks storage units 42a, 42b. Since data "b" is stored in storage units 42a, 42b after data "a" is stored in storage units 42a, 42b, no data inconsistency occurs between storage units 42a, 42b.

However, the two-phase locking mirroring process is disadvantageous in that it results in a longer response time when data is duplicated than when no data is duplicated because a plurality of storage units need to be locked sequentially.

Another problem of the two-phase locking mirroring process is that since a plurality of storage units need to be locked sequentially, the response time is longer as the number of duplicated data, i.e., the number of storage units, is greater.

SUMMARY OF THE INVENTION

It is therefore an object of the present invention to provide a data-storage system, a data storing method, and a recording medium which do not result in a longer response time when data is duplicated with data consistency than when no data is duplicated.

Another object of the present invention is to provide a data storage system, a data storing method, and a recording medium which do not result in a longer response time even if the number of duplicated data is greater.

According to a first aspect of the present invention, there is provided a data storage system comprising a first storage unit and a second storage unit for storing the same data received from a plurality of higher-level devices, wherein the first storage unit transmits sequence information representative of a sequence for storing the data received from the higher-level devices, to the second storage unit, and the second storage unit stores the data received from the higher-level devices according to the sequence based on the sequence information received from the first storage unit.

With the above arrangement, since the first storage unit transmits sequence the information representative of the sequence for storing the data received from the higher-level devices, data consistency is maintained between the first storage unit and the second storage unit. Communications between the higher-level devices and the first and second storage units and communications between the first storage unit and the second storage unit are performed concurrently. Therefore, the response time is not made longer when data is duplicated than when no data is duplicated. Moreover, even if the number of second storage units is increased, since communications between the higher-level devices and all the second storage units and communications between the first storage unit and all the second storage units are performed concurrently, an increase in the number of communication events results in no increase in the response time.

According to a second aspect of the present invention, there is provided a data storage system comprising a first storage unit and a second storage unit for storing the same data received from a plurality of higher-level devices, wherein the first storage unit comprises a main storage unit for storing the data received from the higher-level devices and transmitting sequence information representative of a sequence for storing the data to the second storage unit, and wherein the second storage unit comprises an auxiliary storage unit for storing the data received from the higher-level devices, and a temporary storage unit disposed at a front stage of the auxiliary storage unit, for temporarily storing the data received from the higher-level devices and transferring the temporarily stored data to the auxiliary storage unit according to the sequence based on the sequence information received from the main storage unit.

With the above arrangement, the main storage unit transmits the sequence information representative of the sequence for storing the data to the second storage unit, and the temporary storage unit temporarily stores the data received from the higher-level devices and transfers the temporarily stored data to the auxiliary storage unit according to the sequence based on the sequence information received from the main storage unit. Since the data are transmitted to the main storage unit and the auxiliary storage unit according to the same sequence, data consistency is maintained between the main storage unit and the auxiliary storage unit. Communications between the higher-level devices and the main and temporary storage units and communications between the main storage unit and the temporary storage unit are performed concurrently. Therefore, the response time is not made longer when data is duplicated than when no data is duplicated. Moreover, even if the number of auxiliary storage units is increased, since communications between the higher-level devices and all the temporary storage units and communications between the main storage unit and all the auxiliary storage units are performed concurrently, an increase in the number of communication events results in no increase in the response time.

The above and other objects, features, and advantages of the present invention will become apparent from the following description with reference to the accompanying drawings which illustrate examples of the present invention.

BRIEF DESCRIPTION OF THE DRAWINGS

FIG. 7A is a diagram showing write commands transmitted by a higher-level device according to Embodiment 1 of the present invention;

FIG. 7B is a diagram showing write commands generated by a data transfer unit according to Embodiment 1 of the present invention;

FIG. 7C is a diagram showing sequence information transmitted by a main storage unit according to Embodiment 1 of the present invention;

FIG. 7D is a diagram showing a state of the temporary storage unit according to Embodiment 1 of the present invention;

FIG. 7E is a diagram showing a state of the temporary storage unit according to Embodiment 1 of the present invention;

FIG. 7F is a diagram showing a state of the temporary storage unit according to Embodiment 1 of the present invention;

FIG. 7G is a diagram showing a state of the temporary storage unit according to Embodiment 1 of the present invention;

FIG. 9A is a diagram showing a data set managed by a temporary storage unit according to Embodiment 3 of the present invention;

FIG. 9B is a diagram showing a sequence undetermined link for the temporary storage unit according to Embodiment 3 of the present invention to connect data sets;

FIG. 9C is a diagram showing a sequence information queue for the temporary storage unit according to Embodiment 3 of the present invention to store sequence information;

FIG. 9D is a diagram showing a sequence determined link for the temporary storage unit according to Embodiment 3 of the present invention to connect data sets;

FIG. 10A is a diagram showing write commands transmitted by a higher-level device according to Embodiment 3 of the present invention;

FIG. 10B is a diagram showing write commands generated by a data transfer unit according to Embodiment 3 of the present invention;

FIG. 10C is a diagram showing sequence information transmitted by a main storage unit according to Embodiment 3 of the present invention;

FIG. 10D is a diagram showing a state of the temporary storage unit according to Embodiment 3 of the present invention;

FIG. 10E is a diagram showing a state of the temporary storage unit according to Embodiment 3 of the present invention;

FIG. 10F is a diagram showing a state of the temporary storage unit according to Embodiment 3 of the present invention;

DESCRIPTION OF THE PREFERRED EMBODIMENTS

Preferred embodiments of the present invention will be described in detail below with reference to the drawings.

Figure 2:
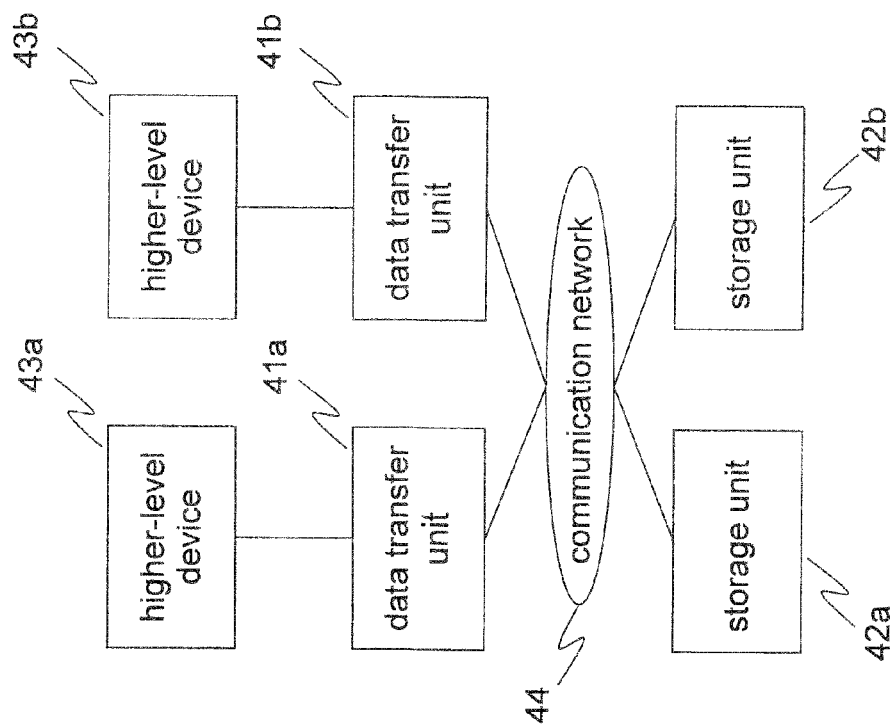
FIG. 2 is a block diagram of another conventional data storage system.
Figure 1:
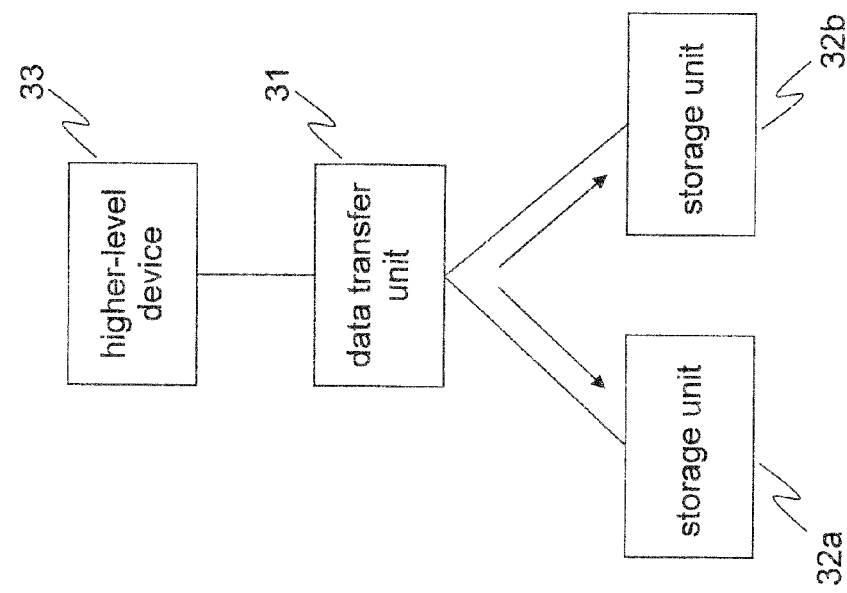
FIG. 1 is a block diagram of a conventional data storage system.
Figure 3:
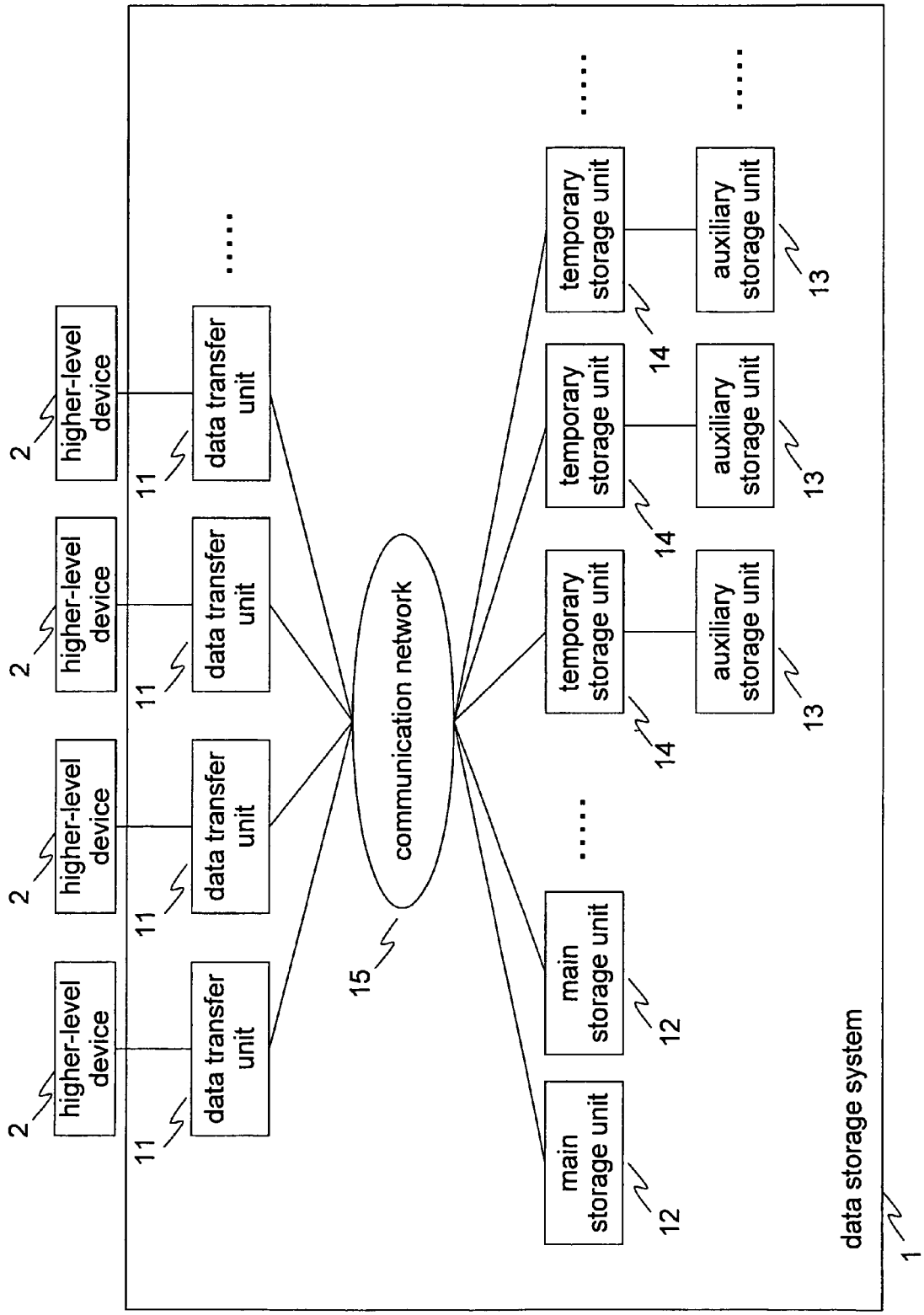
FIG. 3 is a block diagram of a data storage system according to the present invention.

As shown in FIG. 3, data storage system 1 according to the present invention comprises data transfer unit 11, main storage unit 12, auxiliary storage unit 13, temporary storage unit 14 associated with auxiliary storage unit 13, and communication network 15.

Main storage unit 12 serves as a first storage, and auxiliary storage unit 13 and temporary storage unit 14 serve as a second storage.

Data transfer unit 11, main storage unit 12, and temporary storage unit 14 are interconnected by communication network 15 for mutual communications. Temporary storage unit 14 is capable of communicating with auxiliary storage unit 13 that is connected in one-to-one correspondence to temporary storage unit 14 at a rear stage thereof. Data transfer unit 11 is capable of communicating with higher-level device 2 that is connected in one-to-one correspondence to data transfer unit 11 at a front stage thereof.

Higher-level device 2 comprises a host computer or the like for transmitting a write request and data or a read request to data transfer unit 11.

Data transfer unit 11 is disposed between higher-level device 2 and main storage unit 12 and temporary storage unit 14. Data transfer unit 11 transfers a write request and data transmitted from higher-level device 2 to main storage unit 12 and temporary storage unit 14. Data transfer unit 11 also transfers a read request transmitted from higher-level device 2 to main storage unit 12 for reading data from main storage unit 12. Data transfer unit 11 may transfer a read request to temporary storage unit 14 for reading data from auxiliary storage unit 13 or temporary storage unit 14.

Although data transfer unit 11 is connected to higher-level device 2 in one-to-one correspondence in FIG. 3, data transfer unit 11 may be connected to one or more higher-level device 2 through communication network 15.

Data transfer unit 11 is incorporated in data storage system 1 independently of higher-level device 2 in FIG. 3. However, data transfer unit 11 may be incorporated in higher-level device 2.

When there is a write request from higher-level device 2, main storage unit 12 stores data transmitted from higher-level device 2 through data transfer unit 11, and transmits sequence information representative of a sequence for storing the data to temporary storage unit 14. The sequence information does not need to be transmitted from main storage unit 12 directly to temporary storage unit 14, but may be transmitted via data transfer unit 11. When main storage unit 12 receives a plurality of write requests from a plurality of data transfer units 11, main storage unit 12 stores data and transmits sequence information according to the sequences in which main storage unit 12 have received the write requests.

When there is a read request from higher-level device 2, main storage unit 12 transmits stored data through data transfer unit 11 to higher-level device 2.

Data storage system 1 can have a plurality of main storage units 12 as shown in FIG. 3. If data storage system 1 has a plurality of main storage units 12, then unoverlapping address spaces are assigned to respective main storage units 12 such that only one main storage unit 12 is available for storing data at a particular address.

Temporary storage unit 14 is disposed at the front stage of auxiliary storage unit 13. Temporary storage unit 14 temporarily stores a writes request and data transmitted from data transfer unit 11, determine a sequence to transfer data to auxiliary storage unit 13 based on sequence information transmitted from main storage unit 12, and transfers the write request and data to auxiliary storage unit 13 according to the determined sequence.

Auxiliary storage unit 13 stores the data received from temporary storage unit 14, i.e., a duplicate of data stored in main storage unit 12, according to the sequence in which auxiliary storage unit 13 has received the write request from temporary storage unit 14. Data storage system 1 can have a plurality of auxiliary storage units 13 as shown in FIG. 3.

Main storage unit 12 and auxiliary storage unit 13 may be related to each other as follows: For example, one main storage unit 12 may be associated with one auxiliary storage unit 13 (Embodiments 1 through 3), or one main storage unit 12 may be associated with a plurality of auxiliary storage units 13 (Embodiments 4 and 5), or one auxiliary storage unit 13 may be associated with a plurality of main storage units 12 (Embodiment 6). These embodiments will be described in detail later.

Communication network 15 serves to interconnect data transfer unit 11, main storage unit 12, and temporary storage unit 14, as described above. Communication network 15 may comprise any communication network suitable for use with data storage system 1, such as a bus, Ethernet, the Internet, or the like.

Data transfer unit 1, main storage unit 12, auxiliary storage unit 13, and temporary storage unit 14 may be provided as independent units. In this case, data transfer unit 1, main storage unit 12, auxiliary storage unit 13, and temporary storage unit 14 may be interconnected by communication network 15 in the form of Ethernet or an Internet network. Alternatively, data transfer unit 1, main storage unit 12, auxiliary storage unit 13, and temporary storage unit 14 may be connected to either one of two or more communication networks 15 each in the form of Ethernet or an Internet network, and these communication networks may be interconnected by a relay unit such as a rooter or the like. Data transfer unit 1, main storage unit 12, auxiliary storage unit 13, and temporary storage unit 14 may be provided as one unit such as a computer or the like. In this case, data transfer unit 1, main storage unit 12, auxiliary storage unit 13, and temporary storage unit 14 may be interconnected by communication network 15 in the form of a bus or the like.

Operation of data storage system 1 shown in FIG. 3 in the event that there is a write request from higher-level device 2 will be described below.

When data transfer unit 11 receives a write request and data from higher-level device 2, data transfer unit 11 transfers the received write request and data to main storage unit 12 which is assigned to the corresponding address and also to all temporary storage units 14 placed at the front stage of auxiliary storage unit 13 which is assigned to the corresponding address.

In response to the write request from data transfer unit 11, main storage unit 12 stores the data, and transmits sequence information representing a sequence for storing the data to all temporary storage units 14 placed at the front stage of auxiliary storage unit 13 which is assigned to the corresponding address.

When temporary storage units 14 receive the write request and data from data transfer unit 11, temporary storage units 14 store the write request and data according to the sequences in which temporary storage units 14 have received the write request and data. Based on the sequence information transmitted from main storage unit 12, temporary storage units 14 determine a sequence to transmit the data to auxiliary storage unit 13, and transmit the write request and data to auxiliary storage unit 13 according to the determined sequence.

Auxiliary storage unit 13 stores the data received from temporary storage units 14 according to the sequences in which auxiliary storage unit 13 have received the write request from temporary storage units 14.

According to data storage system 1, as described above, main storage unit 12 transmits sequence information representing a sequence for storing data to temporary storage unit 14, and temporary storage unit 14 determines a sequence to transmit data to auxiliary storage unit 13 based on the sequence information. Therefore, even if a plurality of write requests from a plurality of higher-level devices 2 arrive at main storage unit 12 and temporary storage unit 14 according to different sequences, the sequences to store data in main storage unit 12 and the sequence for storing data in auxiliary storage unit 13 are in conformity with each other. In other words, data consistency is ensured between main storage unit 12 and auxiliary storage unit 13.

Furthermore, communications between data transfer unit 11 and main storage unit 12 and communications between data transfer unit 11 and temporary storage unit 14 are performed concurrently, and communications for transmitting sequence information between main storage unit 12 and temporary storage unit 14 are performed concurrently with communications for data transfers and responses between data transfer unit 11, main storage unit 12, and temporary storage unit 14. Accordingly, an increase in the number of communication events for generating duplicated data results in no increase in the response time.

Moreover, even if the number of duplicated data is increased, since communications between data transfer unit 11 and all temporary storage units 14 and communications between main storage unit 12 and all temporary storage units 14 are performed concurrently, an increase in the number of communication events results in no increase in the response time.

Specific embodiments of the present invention will be described in detail below.

Embodiment 1

Figure 4:
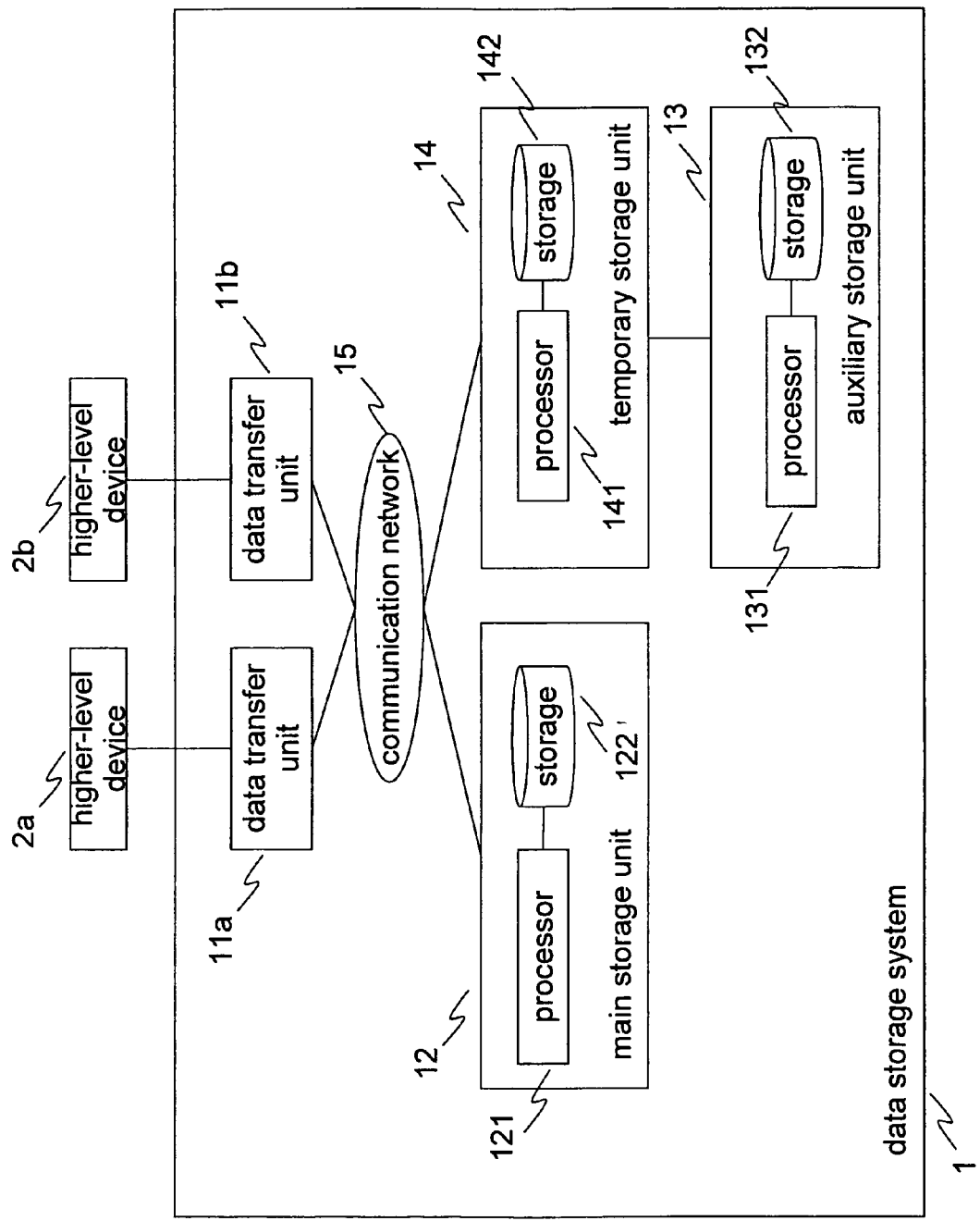
FIG. 4 is a block diagram of a data storage system according to Embodiments 1 through 3 of the present invention.

FIG. 4 shows in block form data storage system 1 according to Embodiment 1 of the present invention. As shown in FIG. 4, data storage system 1 according to Embodiment 1 is of a structure which is basically the same as data storage system 1 shown in FIG. 3. According to Embodiment 1, however, data storage system 1 has single main storage unit 12 and single auxiliary storage unit 13 to which the same address space as main storage unit 12 is assigned, and single auxiliary storage unit 13 stores a duplicate of data stored in single main storage unit 12.

In FIG. 4, data storage system 1 has two data transfer units 11a, 11b and is connected to two higher-level devices 2a, 2b. However, the number of data transfer units and the number of higher-level devices are not limited to any particular values.

Main storage unit 12 comprises processor 121 and storage 122.

Auxiliary storage unit 13 comprises processor 131 and storage 132.

Data storage system 1 also has temporary storage unit 14 comprising processor 141 and storage 142.

Each of storage 122 of main storage unit 12 and storage 132 of auxiliary storage unit 13 may comprise a stack of hard disks, a disk array in a RAID configuration, or a device having a hierarchical structure including semiconductor memories and hard disks. Storage 142 of temporary storage unit 14 may comprise a semiconductor memory such as a DRAM or the like or a hard disk. Preferably, storage 142 should be a high-speed, nonvolatile storage.

Operation of data storage system 1 shown in FIG. 4 at the time higher-level device 2a sends a write request to data transfer unit 11a will be described below with reference to a sequence diagram shown in FIG. 5.

Figure 5:
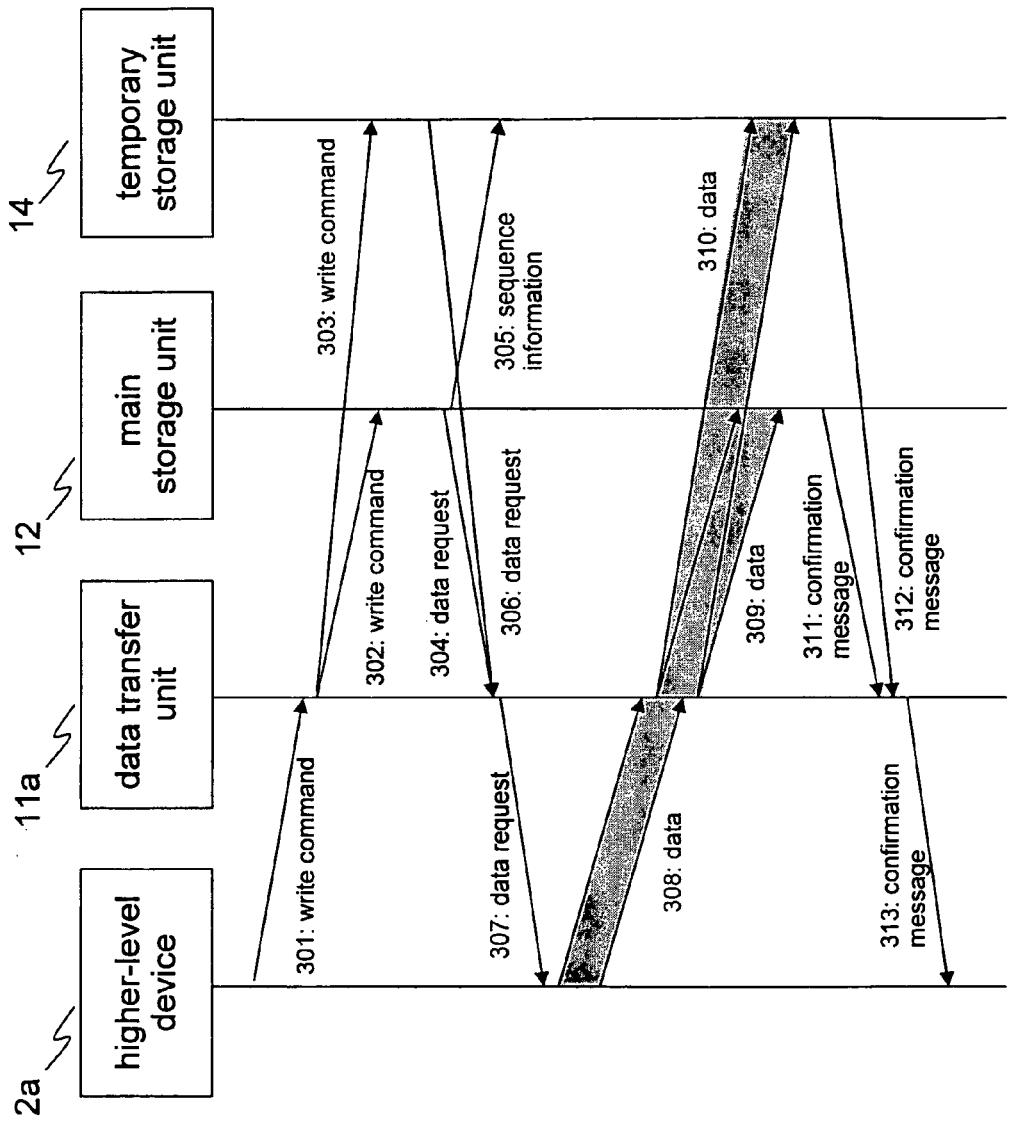
FIG. 5 is a sequence diagram showing operation of the data storage system according to Embodiment 1 of the present invention.

In step 301 shown in FIG. 5, higher-level device 2a transmits a write command to data transfer unit 11a. The write command includes information representative of a write start address (hereinafter referred to as "start address") and a write data length (hereinafter referred to as "data length").

In steps 302, 303, data transfer unit 11a adds a command identifier for uniquely identifying the write command to the write command, and transfers the write command with the added command identifier to main storage unit 12 and temporary storage unit 14.

When processor 121 of main storage unit 12 receives the write command from data transfer unit 11a, processor 121 keeps a write area depending on the data length indicated by the write command in storage 122, and transmits a data request to data transfer unit 11a in step 304.

In step 305, processor 121 adds an execution sequence depending on the sequence in which processor 121 has received the write command, to the write command from data transfer unit 11a, and transmits the execution sequence and the command identifier as sequence information to temporary storage unit 14.

When processor 141 of temporary storage unit 14 receives the write command from data transfer unit 11a, processor 141 stores the information included in the write command in storage 142, keeps a write area depending on the data length indicated by the write command in storage 142, and thereafter transmits a data request to data transfer unit 11a in step 306. When processor 141 receives the sequence information from main storage unit 12, processor 141 searches write commands stored in storage 142 for a write command having a command identifier which agrees with the command identifier of the sequence information, and stores the execution sequence in association with the retrieved write command in storage 142.

When data transfer unit 11a receives the data requests from both main storage unit 12 and temporary storage unit 14, data transfer unit 11a transmits the received data requests to higher-level device 2a in step 307. When data transfer unit 11a receives data from higher-level device 2a in step 308, data transfer unit 11a transfers the data to main storage unit 12 and temporary storage unit 14 in steps 309, 310.

In step 311, processor 121 of main storage unit 12 writes the data received from data transfer unit 11a into the reserved write area in storage 122, and transmits a confirmation message to data transfer unit 11a.

In step 312, processor 141 of temporary storage unit 14 writes the data received from data transfer unit 11a into the reserved write area in storage 142. When both the execution sequence and the data become available, processor 141 transmits a confirmation message to data transfer unit 11a.

When data transfer unit 11a receive the confirmation messages from both main storage unit 12 and temporary storage unit 14, data transfer unit 11a transmits a confirmation message to higher-level device 2a in step 313.

Subsequently, when a preset condition is satisfied, processor 141 of temporary storage unit 14 searches storage 142 for a write command and data associated with an execution sequence in which they are to be transferred next, and transmits the retrieved write command and data to auxiliary storage unit 13. Then, processor 141 repeats such a searching and transmitting process until no such write commands and data are retrieved from storage 142.

Processor 131 of auxiliary storage unit 13 stores the data in storage 132 according to the sequence in which processor 131 has received the write command from temporary storage unit 14.

Details of the operation of temporary storage unit 14 at the time higher-level device 2a sends a write request to data transfer unit 11a will be described below with reference to a flowchart shown in FIG. 6. Temporary storage unit 14 stores a command identifier, a start address, a data length, data, and an execution sequence for a single write command from higher-level device 2a.

Figure 6:
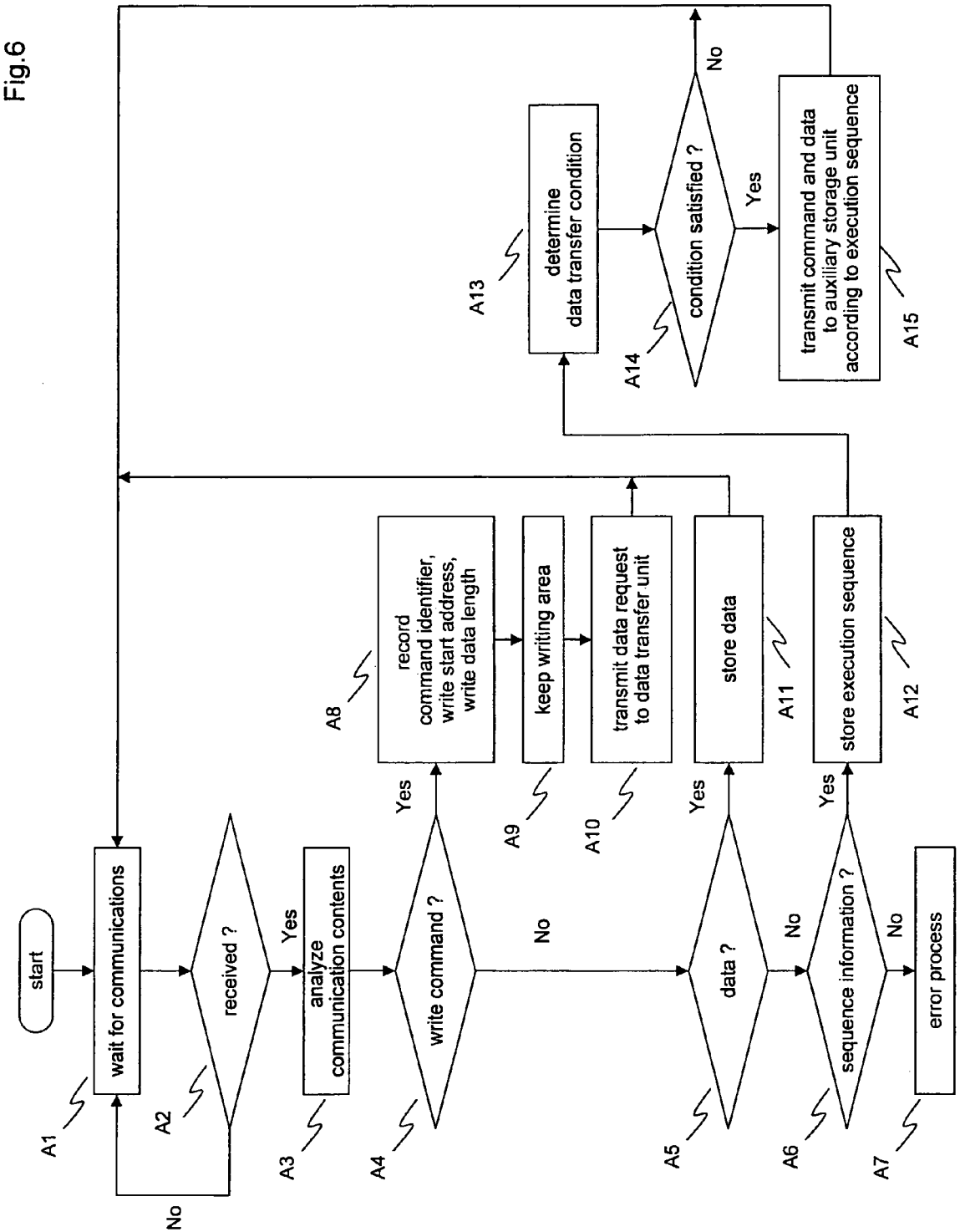
FIG. 6 is a flowchart of an operation sequence of a temporary storage unit according to Embodiment 1 of the present invention.

As shown in FIG. 6, processor 141 of temporary storage unit 14 waits for communications in step A1. If processor 141 receives information from an external source in step A2, then processor 141 analyzes the content of the received information in step A3.

For example, if the information received in step A2 represents a write command in step A4, then processor 141 temporarily stores the command identifier, the start address, and the data length included in the write command in storage 142 in step A8. In step A9, processor 141 keeps a write area depending on the data length as a data area in storage 142. Subsequently, processor 141 transmits a data request to data transfer unit 11a in step A10. Then, control returns to step A1 for processor 141 to wait for communications.

If the information received in step A2 does not represent a write command in step A4, but represents data in step A5, then processor 141 stores the data in a data area which has been kept in advance in storage 142 in step A11. Then, control returns to step A1 for processor 141 to wait for communications.

If the information received in step A2 does not represent data in step A5, but represents sequence information in step A6, then processor 141 searches write commands stored in storage 142 for a write command having a command identifier which agrees with the command identifier of the sequence information, and stores an execution sequence in association with the retrieved write command in storage 142 in step A12. After having stored the execution sequence, processor 141 determines whether or not a preset data transfer condition is satisfied to transmit the write command and data to auxiliary storage unit 13 in step A13. The data transfer condition is satisfied, for example, when storage 142 has a free storage space smaller than a predetermined level or when the number of write commands transmitted to auxiliary storage unit 13 is equal to or greater than a predetermined number. If the data transfer condition is met in step A14, then processor 141 searches storage 142 for a write command and data associated with an execution sequence in which they are to be transferred next, and transmits the retrieved write command and data to auxiliary storage unit 13 in step A15. In step A15, processor 141 repeats such a searching and transmitting process until no such write commands and data are retrieved from storage 142. Alternatively, processor 141 may determine the number of write commands or the amount of data to be transferred at one time to auxiliary storage unit 13, based on a preset value. Subsequently, control returns to step A1 for processor 141 to wait for communications.

If the information received in step A2 represents neither a write command, nor data, nor sequence information, then processor 141 performs a preset error process in step A7.

Processor 141 may erase the write command and data that have been transferred to auxiliary storage unit 13, from storage 142.

Since auxiliary storage unit 13 stores the data according to the sequence in which main storage unit 12 stores the data, data consistency is achieved between main storage unit 12 and auxiliary storage unit 13.

The fact that data are stored at the same sequences in main storage unit 12 and auxiliary storage unit 13 will be described in detail below with reference to FIGS. 7A through 7C.

In FIGS. 7A through 7C, it is assumed that data transfer unit 11a receives write command "a" from higher-level device 2a and, substantially at the same time, data transfer unit 11b receives write command "b" from higher-level device 2b. The contents of write commands "a", "b" are shown in FIG. 7A. As shown in FIG. 7A, each of write commands "a", "b" is a command for requesting that a data length represented by sector 40 h be written from start address 200 h. The suffix "h" attached to the numerical values indicate the hexadecimal notation.

Data transfer unit 11a adds command identifier 1-0010, for example, to write command "a", thereby generating write command "a'". Data transfer unit 11b adds command identifier 2-0005, for example, to write command "b", thereby generating write command "b'". Different command identifiers are used respectively for data transfer units 11a, 11b so that no identical command identifier will be added by data transfer units 11a, 11b. The details of write commands "a'", "b'" generated respectively by data transfer units 11a, 11b are shown in FIG. 7B.

Data transfer unit 11a transfers write command "a'" to main storage unit 12 and temporary storage unit 14, and data transfer unit 11b transfers write command "b'" to main storage unit 12 and temporary storage unit 14.

It is assumed that write command "a'" arrives at main storage unit 12 earlier than write command "b'", and write command "b'" arrives at temporary storage unit 14 earlier than write command "a'".

Processor 121 of main storage unit 12 processes write command "a'" earlier than write command "b'". Processor 121 sets the execution sequence of write command "a'" to "1", and transmits the command identifier and the execution sequence of write command "a'" as sequence information "a" to temporary storage unit 14. Processor 121 also sets the execution sequence of write command "b'" to "2", and transmits the command identifier and the execution sequence of write command "b'" as sequence information "b" to temporary storage unit 14. The details of sequence information "a", "b" transmitted from main storage unit 12 to temporary storage unit 14 are shown in FIG. 7C.

When processor 141 of temporary storage unit 14 first receives write command "b'", processor 141 stores the information included in write command "b'" into storage 142, and keeps a data area for storing data of the data length (sector 40 h) in storage 142. Processor 141 also keeps an execution sequence area for storing the execution sequence of write command "b'" in storage 142. FIG. 7D shows a state of storage unit 142 at this time.

When processor 141 then receives write command "a'", processor 141 stores the information included in write command "a'" into storage 142, and keeps a data area for storing data of the data length (sector 40 h) in storage 142. Processor 141 also keeps an execution sequence area for storing the execution sequence of write command "a'" in storage 142. FIG. 7E shows a state of storage unit 142 at this time.

When processor 141 receives sequence information "a" from main storage unit 12, processor 141 searches the write commands stored in storage 142 for a write command having a command identifier which agrees with the command identifier of sequence information "a", and stores the execution sequence included in sequence information "a" in association with the retrieved write command in the reserved execution sequence area of storage 142. When processor 141 receives sequence information "b" from main storage unit 12, processor 141 searches the write commands stored in storage 142 for a write command having a command identifier which agrees with the command identifier of sequence information "b", and stores the execution sequence included in sequence information "b" in association with the retrieved write command in the reserved execution sequence area of storage 142. FIG. 7F shows a state of storage unit 142 at this time.

When processor 141 receives data "a" corresponding to write command "a'", processor 141 stores data "a" into the reserved area of storage 142. When processor 141 receives data "b" corresponding to write command "b'", processor 141 stores data "b" into the reserved area of storage 142. FIG. 7G shows a state of storage unit 142 at this time.

Subsequently, if a data transfer condition that has been preset in the state of storage 142 shown in FIG. 7G is satisfied, then processor 141 searches for write command "a'" and data "a" associated with the execution sequence set to "1", and transmits retrieved write command "a'" and data "a" to auxiliary storage unit 13. Then, processor 141 searches for write command "b'" and data "b" associated with the execution sequence set to "2", and transmits retrieved write command "b'" and data "b" to auxiliary storage unit 13. Thereafter, processor 141 searches for a write command and data associated with the execution sequence set to "3". Since no such write command and data can be retrieved, processor 141 stops operating to transmit commands and data to auxiliary storage unit 13. If a next data transfer condition is satisfied, then processor 141 starts to search for a write command and data associated with the execution sequence set to "3".

Sequence information "a" from main storage unit 12 may possibly arrive at temporary storage unit 14 earlier than write command "a'" from data transfer unit 11a. In such a case, processor 141 may temporarily store sequence information "a" and then store an execution sequence in association with write command "a'" at the time write command "a'" arrives.

Furthermore, data "b" from data transfer unit 11b may possibly arrive at temporary storage unit 14 earlier than sequence information "b" from main storage unit 12. In such a case, processor 141 stores data "b" first.

According to the present embodiment, since data is stored in auxiliary storage unit 13 according to the execution sequence stored in temporary storage unit 14, data "a" is stored earlier than data "b". Consequently, data "a" is stored earlier than data "b" in both main storage unit 12 and auxiliary storage unit 13. Data consistency is thus maintained between main storage unit 12 and auxiliary storage unit 13.

If higher-level devices 2a, 2b transmit a read request to data transfer units 11a, 11b, then main storage unit 12 reads stored data and transmits the read data through data transfer units 11a, 11b to higher-level devices 2a, 2b. However, auxiliary storage unit 13 or temporary storage unit 14 may extract latest data of a read start address included in the read request from the data stored in auxiliary storage unit 13 and temporary storage unit 14, and may transmit the read latest data through data transfer units 11a, 11b to higher-level devices 2a, 2b.

Embodiment 2

Data storage system 1 according to Embodiment 2 of the present invention is of a structure identical to data storage system 1 according to Embodiment 1 as shown in FIG. 4, but differs therefrom as to an operation sequence.

Operation of data storage system 1 according to Embodiment 2 at the time higher-level device 2a sends a write request to data transfer unit 11a will be described below with reference to a sequence diagram shown in FIG. 8.

Figure 8:
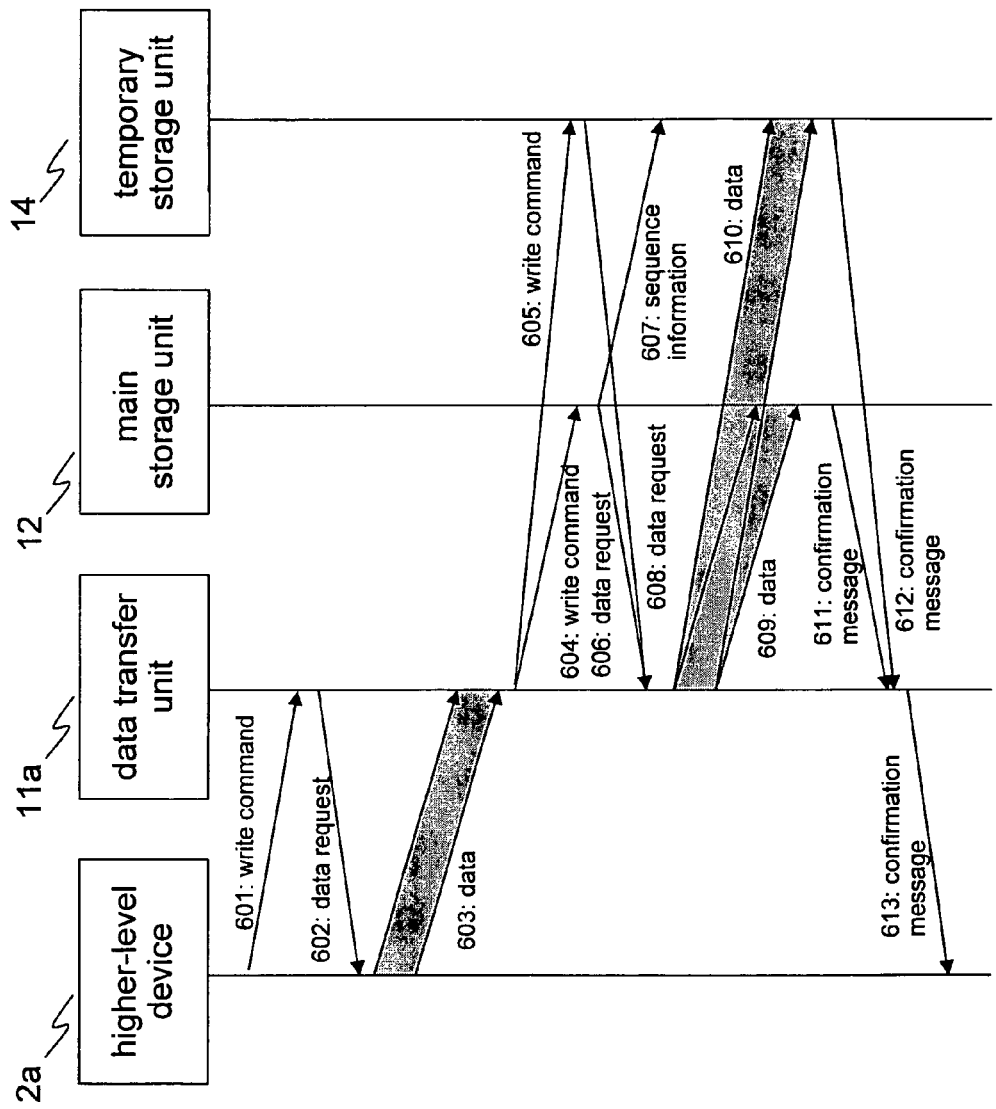
FIG. 8 is a sequence diagram showing operation of the data storage system according to Embodiment 2 of the present invention.

In step 601 shown in FIG. 8, data transfer unit 11a receives a write command from higher-level device 2a. In step 602, data transfer unit 11a temporarily keeps a storage area depending on the data length of the write command in data transfer unit 11a, and transmits a data request to higher-level device 2a. In step 603, data transfer unit 11a receives data from higher-level device 2a. In steps 604, 605, data transfer unit 11a adds a command identifier for uniquely identifying the write command to the write command, and transfers the write command with the added command identifier to main storage unit 12 and temporary storage unit 14.

When processor 121 of main storage unit 12 receives the write command from data transfer unit 11a, processor 121 keeps a write area depending on the data length indicated by the write command in storage 122, and transmits a data request to data transfer unit 11a in step 606.

In step 607, processor 121 adds an execution sequence depending on the sequence in which processor 121 has received the write command, to the write command from data transfer unit 11a, and transmits the execution sequence and the command identifier as sequence information to temporary storage unit 14.

When processor 141 of temporary storage unit 14 receives the write command from data transfer unit 11a, processor 141 keeps a write area depending on the data length of the write command in storage 142, and thereafter transmits a data request to data transfer unit 11a in step 608. When processor 141 receives the sequence information from main storage unit 12, processor 141 stores, into storage 142, the execution sequence of the sequence information in association with a write command having a command identifier which agrees with the command identifier of the sequence information.

When data transfer unit 11a receives the data requests from both main storage unit 12 and temporary storage unit 14, data transfer unit 11a transmits data to main storage unit 12 and temporary storage unit 14 in steps 609, 610.

In step 611, processor 121 of main storage unit 12 writes the data received from data transfer unit 11a into the reserved write area in storage 122, and transmits a confirmation message to data transfer unit 11a.

In step 612, processor 141 of temporary storage unit 14 writes the data received from data transfer unit 11a into the reserved write area in storage 142. When both the execution sequence and the data become available, processor 141 transmits a confirmation message to data transfer unit 11a.

When data transfer unit 11a receive the confirmation messages from both main storage unit 12 and temporary storage unit 14, data transfer unit 11a transmits a confirmation message to higher-level device 2a in step 613.

When a preset condition is satisfied, processor 141 of temporary storage unit 14 searches storage 142 for a write command and data associated with an execution sequence in which they are to be transferred next, and transmits the retrieved write command and data to auxiliary storage unit 13.

Then, processor 141 repeats such a searching and transmitting process until no such write commands and data are retrieved from storage 142.

Processor 131 of auxiliary storage unit 13 stores the data in storage 132 according to the sequence in which processor 131 has received the write command from temporary storage unit 14.

According to the present embodiment, since data transfer unit 11a receives data from higher-level device 2a before transmitting write commands to main storage unit 12 and temporary storage unit 14, data transfer unit 11a is capable of transmitting the data to main storage unit 12 and temporary storage unit 14 immediately after it receives data requests from main storage unit 12 and temporary storage unit 14. Therefore, the time required for main storage unit 12 and temporary storage unit 14 to operate after they receive a write command until they transmit a confirmation message is shortened, and the resources are effectively utilized.

Embodiment 3

Data storage system 1 according to Embodiment 3 of the present invention is of a structure identical to data storage system 1 according to Embodiment 1 as shown in FIG. 4 and operates according to an operation sequence identical to the operation sequence shown in FIG. 5. However, data storage system 1 according to Embodiment 3 differs from data storage system 1 according to Embodiment 1 as to the data structure of the sequence information and the operation of temporary storage unit 14.

According to the present embodiment, communication network 15 employs a protocol for ensuring sequences between a node and another node. Specifically, it is guaranteed that the sequence information transmitted from main storage unit 12 to temporary storage unit 14 is received by temporary storage unit 14 according to the sequence in which it is transmitted from main storage unit 12.

When main storage unit 12 determines an execution sequence of a write command therein, main storage unit 12 transmits only a command identifier as sequence information to temporary storage unit 14. Based on the sequence in which temporary storage unit 14 has received the sequence information, temporary storage unit 14 determines a sequence to transfer data to auxiliary storage unit 13.

A data structure of temporary storage unit 14 will be described below with reference to FIGS. 9A through 9D.

Processor 141 of temporary storage unit 14 manages a data set including a command identifier, a start address, a data length, and data with respect to a single write command, in storage 142. The data set has a structure shown in FIG. 9A.

Processor 141 temporarily connects, in storage 142, a data set with respect to a write command to the trailing end of data sets of a sequence undetermined link according to the sequence in which the write command is received from data transfer units 11a, 11b. The sequence undetermined link with the data set connected thereto is illustrated in FIG. 9B. In FIG. 9B, a sequence undetermined head indicates that a data set to link to is at the leading end of the data sets of the sequence undetermined link, and a sequence undetermined tail indicates that a data set to link from is at the trailing end of the data sets of the sequence undetermined link.

Processor 141 accumulates, in storage 142, sequence information in a sequence information queue according to the sequences in which the sequence information is received from main storage unit 12. FIG. 9C shows the sequence information accumulated in the sequence information queue. The sequence information queue is of a so-called FIFO (First In, First Out) configuration where information that is inserted first is taken out first.

Processor 141 searches, in storage 142, the data sets connected to a sequence undetermined link for a data set which agrees with the command information of sequence information that is taken out first from a sequence information queue, separates the retrieved data set from the sequence undetermined link, and connects the separated data set to the trailing end of the data sets of a sequence determined link. The sequence determined link with the with the data set connected thereto is illustrated in FIG. 9D. In FIG. 9D, a sequence determined head indicates that a data set to link to is at the leading end of the data sets of the sequence determined link, and a sequence determined tail indicates that a data set to link from is at the trailing end of the data sets of the sequence determined link.

To the sequence determined link, therefore, there is connected a data set according to the same sequence as a write command for writing data in main storage unit 12.

Subsequently, when a preset data transfer condition is satisfied, processor 141 extracts a write command and data from the data set at the leading end of the sequence determined link in storage 142, transmits the extracted write command and data to auxiliary storage unit 13, and separates the data set from which the write command and data have been transmitted, from the sequence determined link. Furthermore, processor 141 repeats such an extracting, transmitting, and separating process until all the data sets connected to the sequence determined link are removed.

Since the write commands and data are transmitted to auxiliary storage unit 13 according to the sequences in which they are connected to the sequence determined link, the data are stored in auxiliary storage unit 13 according to the same sequences as the sequences in which the data are stored in main storage unit 12.

Operation of temporary storage unit 14 and the fact that data are stored at the same sequences in main storage unit 12 and auxiliary storage unit 13 will be described in detail below with reference to FIGS. 10A through 10C.

In FIGS. 10A through 10C, it is assumed that data transfer unit 11a receives write command "a" from higher-level device 2a and, substantially at the same time, data transfer unit 11b receives write command "b" from higher-level device 2b. The contents of write commands "a", "b" are shown in FIG. 10A. As shown in FIG. 10A, each of write commands "a", "b" is a command for requesting that a data length represented by sector 40 h be written from start address 200 h.

Data transfer unit 11a adds command identifier 1-0010, for example, to write command "a", thereby generating write command "a'". Data transfer unit 11b adds command identifier 2-0005, for example, to write command "b", thereby generating write command "b'". Different command identifiers are used respectively for data transfer units 11a, 11b so that no identical command identifier will be added by data transfer units 11a, 11b. The details of write commands "a'", "b'" generated respectively by data transfer units 11a, 11b are shown in FIG. 10B.

Data transfer unit 11a transfers write command "a'" to main storage unit 12 and temporary storage unit 14, and data transfer unit 11b transfers write command "b'" to main storage unit 12 and temporary storage unit 14.

It is assumed that write command "a'" arrives at main storage unit 12 earlier than write command "b'", and write command "b'" arrives at temporary storage unit 14 earlier than write command "a'".

Processor 121 of main storage unit 12 processes write command "a'" earlier than write command "b'". Processor 121 transmits only the command identifier included in write command "a'" as sequence information "a" to temporary storage unit 14. Thereafter, processor 121 transmits only the command identifier included in write command "b'" as sequence information "b" to temporary storage unit 14. The details of sequence information "a", "b" transmitted from main storage unit 12 to temporary storage unit 14 are shown in FIG. 10C.

When processor 141 of temporary storage unit 14 first receives write command "b'", processor 141 stores the information included in write command "b'" and an area for storing data of the data length (sector 40 h) as a data set into storage 142. Processor 141 connects a data set with respect to write command "b'" to the trailing end of a sequence undetermined link. FIG. 10D shows a state of storage unit 142 at this time.

When processor 141 of temporary storage unit 14 then receives write command "a'", processor 141 stores the information included in write command "a'" and an area for storing data of the data length (sector 40 h) as a data set into storage 142. Processor 141 connects a data set with respect to write command "a'" to the trailing end of a sequence undetermined link. FIG. 10E shows a state of storage unit 142 at this time.

Figure 10G:
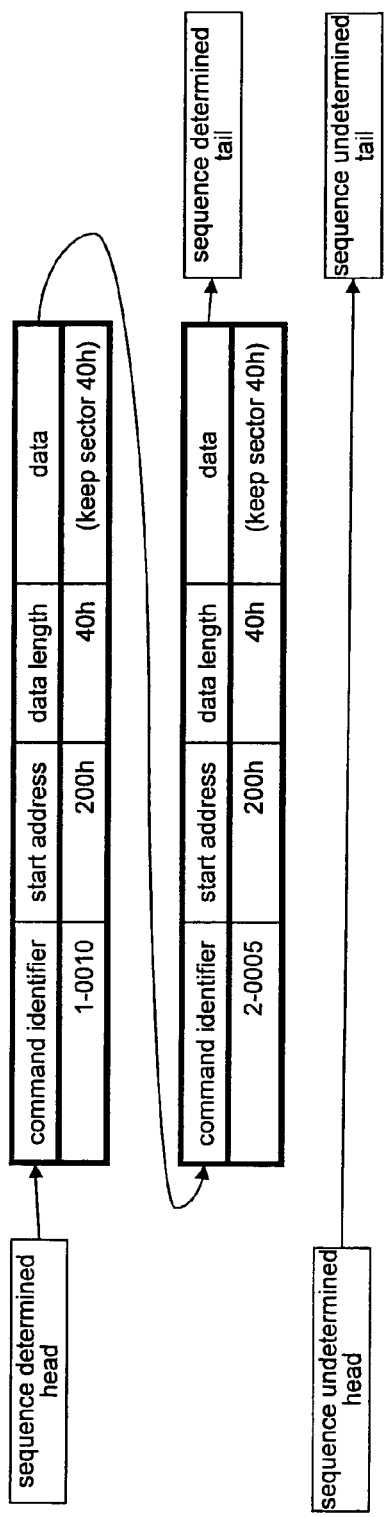
FIG. 10G is a diagram showing a state of the temporary storage unit according to Embodiment 3 of the present invention.

In temporary storage unit 14, the sequence information from main storage unit 12 is received in the order of sequence information "a" and sequence information "b". Therefore, processor 141 inserts the sequence information in the order of sequence information "a" and sequence information "b" into a sequence information queue. In this case, sequence information "a" is first taken out from the sequence information queue. Consequently, processor 141 searches the data sets connected to the sequence undetermined link for a data set having a command identifier which agrees with the command identifier included in sequence information "a", separates the retrieved data set from the sequence undetermined link, and connects the separated data set to the trailing end of a sequence determined link. A state of storage 142 at this time is shown in FIG. 10F. Sequence information "b" is then taken out from the sequence information queue. Consequently, processor 141 searches the data sets connected to the sequence undetermined link for a data set having a command identifier which agrees with the command identifier included in sequence information "b", separates the retrieved data set from the sequence undetermined link, and connects the separated data set to the trailing end of the sequence determined link. A state of storage 142 at this time is shown in FIG. 10G.

Figure 10H:
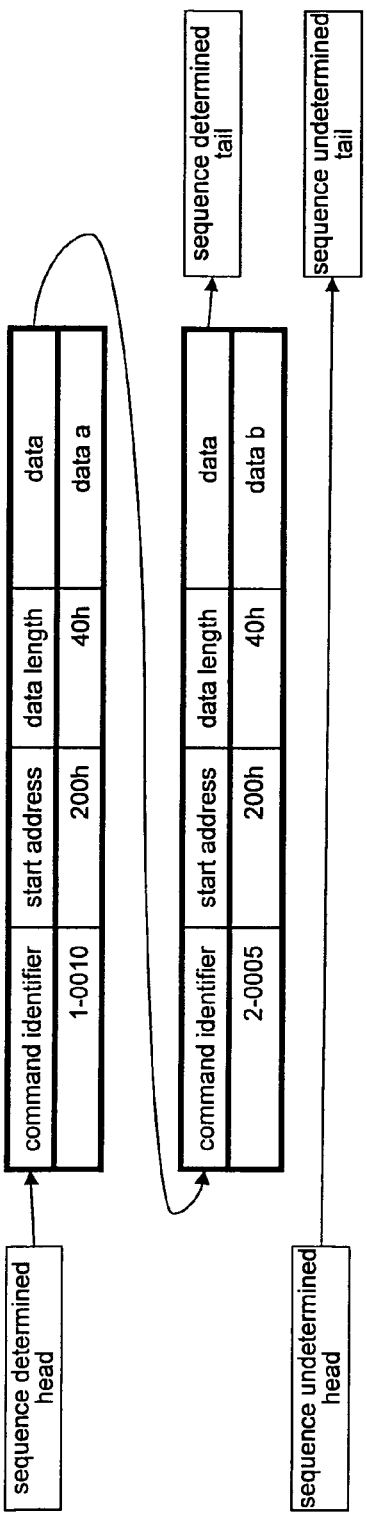
FIG. 10H is a diagram showing a state of the temporary storage unit according to Embodiment 3 of the present invention.

When processor 141 receives data "a" corresponding to write command "a'", processor 141 stores data "a" into the reserved area of storage 142. When processor 141 receives data "b" corresponding to write command "b'", processor 141 stores data "b" into the reserved area of storage 142. FIG. 10H shows a state of storage unit 142 at this time.

Subsequently, if a data transfer condition that has been preset in the state of storage 142 shown in FIG. 10H is satisfied, then processor 141 searches for write command "a'" and data "a" from the data set at the leading end of the sequence determined link, transmits retrieved write command "a'" and data "a" to auxiliary storage unit 13, and separates the data set with write command "a'" and data "a" from the sequence determined link. Then, processor 141 extracts write command "b'" and data "b" from the data set the leading end of the sequence determined link, transmits the extracted write command "b'" and data "b" to auxiliary storage unit 13, and separates data set with write command "b'" and data "b" from the sequence determined link. At this time, since no data set is connected to the sequence determined link, processor 141 finishes its operation to transmit write commands and data to auxiliary storage unit 13.

Sequence information "a" from main storage unit 12 may possibly arrive at temporary storage unit 14 earlier than write command "a'" from data transfer unit 11a. In such a case, processor 141 does not connect the data set to the trailing end of the sequence determined link until a write command corresponding to the sequence information at the leading end of the sequence information queue arrives.

Data "b" from data transfer unit 11b may possibly arrive at temporary storage unit 14 earlier than sequence information "b" from main storage unit 12. In such a case, processor 141 stores data "b" which remains connected to the sequence undetermined link.

In the present embodiment, since data is stored in auxiliary storage unit 13 according to the sequence in which the data set is connected to the sequence determined link in temporary storage unit 14, data "a" is stored earlier than data "b". Consequently, data "a" is stored earlier than data "b" in both main storage unit 12 and auxiliary storage unit 13. Data consistency is thus maintained between main storage unit 12 and auxiliary storage unit 13.

In the present embodiment, furthermore, inasmuch as the data storage system has such a data structure that the data set is connected to the sequence determined link according to the sequence in which the write command and data are transmitted from temporary storage unit 14 to auxiliary storage unit 13, processor 141 of temporary storage unit 14 does not need to search for a command and data to be transmitted each time it transmits a command and data to auxiliary storage unit 13. Consequently, the process of transmitting a command and data from temporary storage unit 14 to auxiliary storage unit is speeded up.

Embodiment 4

Figure 11:
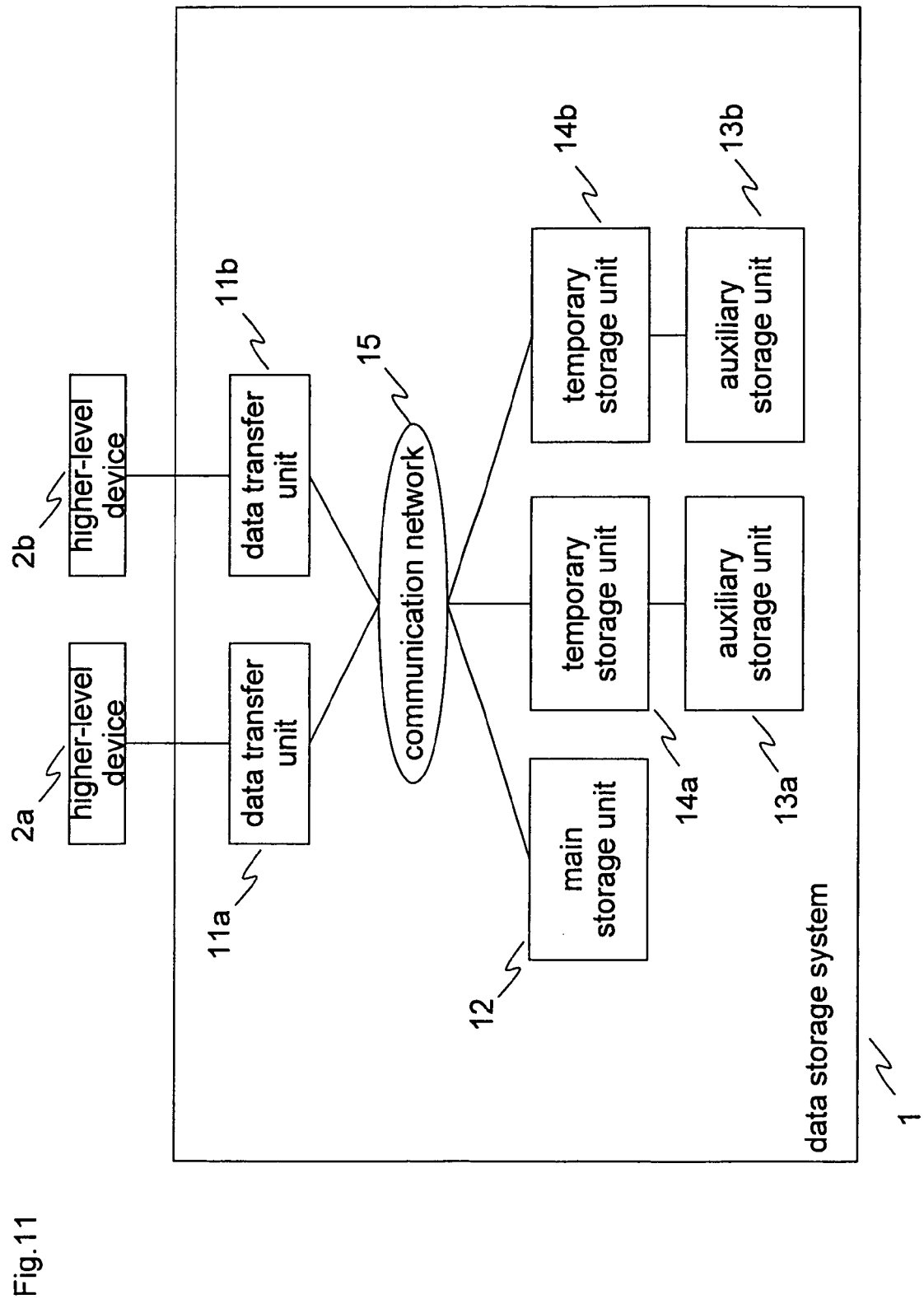
FIG. 11 is a block diagram of a data storage system according to Embodiments 4 and 5 of the present invention.

As shown in FIG. 11, data storage system 1 according to Embodiment 4 of the present invention differs from data storage system 1 according to Embodiment 1 in that it has single main storage unit 12 and two auxiliary storage units 13a, 13b to each of which the same address space as main storage unit 12 is assigned, and two auxiliary storage units 13 redundantly store a duplicate of data stored in single main storage unit 12.

In FIG. 11, data storage system 1 also has two temporary storage units 14a, 14b associated respectively with auxiliary storage units 13a, 13b. Alternatively, data storage system 1 may have three or more temporary storage units. All the temporary storage units store a duplicate of data stored in single main storage unit 12.

Details of operation of data storage system 1 according to Embodiment 4 which are different from those of data storage system 1 according to Embodiment 1 will be described below.

Data transfer units 11a, 11b transmit a write command and data to main storage unit 12 and all temporary storage units 14a, 14b. After data transfer units 11a, 11b receive a data request from main storage unit 12 and all temporary storage units 14a, 14b, data transfer units 11a, 11b transmit a data request to higher-level devices 2a, 2b. After data transfer units 11a, 11b receive a confirmation message from main storage unit 12 and all temporary storage units 14a, 14b, data transfer units 11a, 11b transmit a confirmation message to higher-level devices 2a, 2b. Main storage unit 12 transmits sequence information to all temporary storage units 14a, 14b. Temporary storage units 14a, 14b and auxiliary storage units 13a, 13b operate in the same manner as the temporary storage unit and the auxiliary storage unit according to Embodiment 1.

According to the present embodiment, since the same data is stored in three storage units, i.e., one main storage unit 12 and two auxiliary storage units 13a, 13b, the data will not be lost even when a fault occurs in two of the storage units.

According to the present embodiment, furthermore, communications between data transfer units 11a, 11b and all temporary storage units 14a, 14b are performed concurrently, and communications between main storage unit 12 and all temporary storage units 14a, 14b are performed concurrently. Consequently, the time required for data transfer units 11a, 11b to operate after they receive a write command from higher-level devices 2a, 2b until they transmit a confirmation message to higher-level devices 2a, 2b does not depend on the number of sets of temporary storage units 14a, 14b and auxiliary storage units 13a, 13b. Therefore, the redundancy is increased without an increase in the time of a response to higher-level devices 2a, 2b.

Embodiment 5

Data storage system 1 according to Embodiment 5 of the present invention is of a structure identical to data storage system 1 according to Embodiment 4 as shown in FIG. 11, but differs therefrom in that a duplicate of the data stored in one main storage unit 12 is distributed and stored in two auxiliary storage units 13a, 13b.

In FIG. 11, data storage system 1 has two auxiliary storage units 13a, 13b and two temporary storage units 14a, 14b associated respectively therewith. However, data storage system 1 may have three or more auxiliary storage units and three or more temporary storage units.

Details of operation of data storage system 1 according to Embodiment 5 which are different from those of data storage system 1 according to Embodiment 4 will be described below.

Main storage unit 12 has an address space ranging from 0 h to 10000 h. Auxiliary storage unit 13a stores a duplicate of data stored at addresses 0 h through BFFFh of main storage unit 12, and auxiliary storage unit 13b stores a duplicate of data stored at addresses C000 h through 10000 h of main storage unit 12.

It is assumed, for example, that data transfer unit 11a receives a write command having start address D000 h and data length 100 h from higher-level device 2a. According to the received write command, main storage unit 12 and auxiliary storage unit 13b store data. Therefore, data transfer unit 11a may transmit a write command and data to only main storage unit 12 and temporary storage unit 14b at the front stage of auxiliary storage unit 13b, and receive a data request and a confirmation message. Main storage unit 12 may transmit sequence information to only temporary storage unit 14b.

Alternatively, data transfer unit 11a may transmit a write command and data to main storage unit 12 and all temporary storage units 14a, 14b irrespective of the start address, and main storage unit 12 may transmit sequence information to all temporary storage units 14a, 14b. Temporary storage units 14a, 14b ignore communications irrelevant to the addresses of corresponding auxiliary storage units 13a, 13b. Data transfer unit 11a does not wait for a data request and a confirmation message from irrelevant temporary storage units 14a, 14b.

According to the present embodiment, a duplicate of data stored in main storage unit 12 can be distributed and stored in a plurality of auxiliary storage units 13a, 13b. Therefore, the number of temporary storage units 14a, 14b and auxiliary storage units 13a, 13b can be changed depending on how main storage unit 12 is used. Specifically, when the used storage capacity of main storage unit 12 is small, only temporary storage unit 14a and auxiliary storage unit 13a may be connected to main storage unit 12. When the used storage capacity of main storage unit 12 is increased, temporary storage unit 14b and auxiliary storage unit 13b may additionally be connected to main storage unit 12.

Embodiment 6

Figure 12:
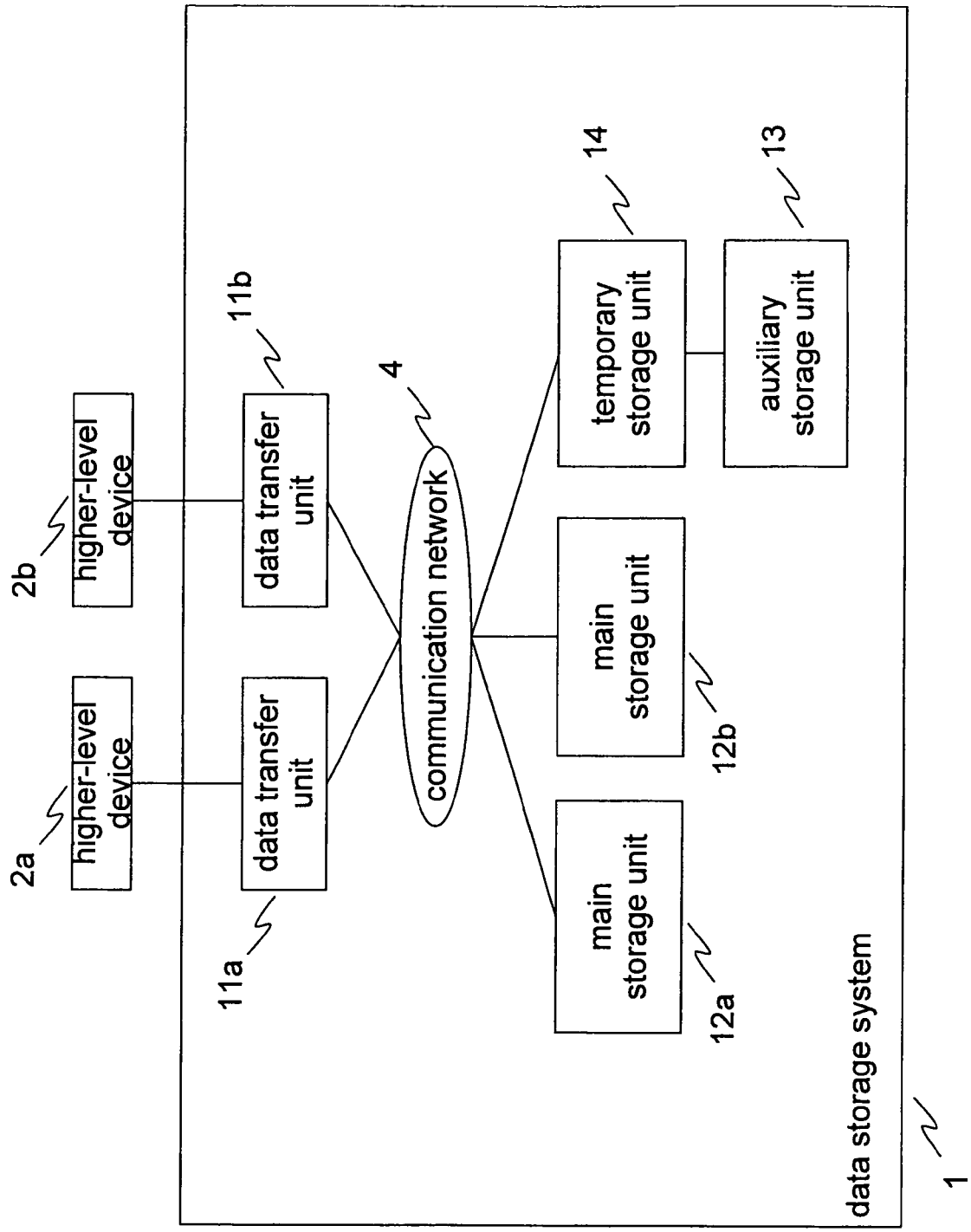
FIG. 12 is a block diagram of a data storage system according to Embodiment 6 of the present invention.

As shown in FIG. 12, data storage system 1 according to Embodiment 6 of the present invention has single auxiliary storage unit 13 and two main storage units 12a, 12b to which unoverlapping portions of the address space of auxiliary storage unit 13 are assigned, and differs from data storage system 1 according to Embodiment 1 in that single auxiliary storage unit 13 stores a duplicate of data stored in two main storage units 12a, 12b.

In FIG. 12, data storage system 1 has two main storage units 12a, 12b associated with single auxiliary storage unit 13. Alternatively, data storage system 1 may have three or more main storage units. Auxiliary storage unit 13 stores a duplicate of data stored in all the main storage units.

Details of operation of data storage system 1 according to Embodiment 6 which are different from those of data storage system 1 according to Embodiment 4 will be described below.

Main storage unit 12a has an address space ranging from 0 h to BFFFh, and main storage unit 12a has an address space ranging from C000 h to 10000 h. Auxiliary storage unit 13 stores a duplicate of data stored at addresses 0 h through 10000 h of main storage units 12a, 12b.

It is assumed, for example, that data transfer unit 11a receives a write command having start address D000 h and data length 100 h from higher-level device 2a. According to the received write command, main storage unit 12b and auxiliary storage unit 13 store data. Therefore, data transfer unit 11a may transmit a write command and data to only main storage unit 12b and temporary storage unit 14 at the front stage of auxiliary storage unit 13, and receive a data request and a confirmation message. Only main storage unit 12b may transmit sequence information to temporary storage unit 14.

Alternatively, data transfer unit 11a may transmit a write command and data to all main storage units 12a, 12b and temporary storage unit 14 irrespectively of the start address. Main storage units 12a, 12b ignore communications irrelevant to the addresses thereof. Data transfer unit 11a does not wait for a data request and a confirmation message from irrelevant main storage units 12a, 12b.

Temporary storage unit 14 receives sequence information from both main storage units 12a, 12b, and may establish sequences again with a new system according to the sequences in which the sequence information is received. Alternatively, temporary storage unit 14 may handle the sequence information received from main storage units 12a, 12b with different systems.

According to the present embodiment, a duplicate of data stored in main storage units 12a, 12b can be collectively stored in single auxiliary storage unit 13. Therefore, the number of temporary storage unit 14 and auxiliary storage unit 13 which are required to generate a duplicate of data stored in main storage units 12a, 12b may be smaller than the number of main storage units 12a, 12b.

According to the present invention, if data storage system 1 is implemented by a single computer, then data storage system 1 may incorporate a recording medium storing a program for performing the above process. The recording medium may comprise a magnetic disk, a semiconductor memory, or any of other recording mediums. The program is read from the recording medium into data storage system 1 and controls the operation of data storage system 1. Specifically, a CPU (Central Processing Unit), not shown, of data storage system 1 is controlled by the program to instruct hardware resources in data storage system 1 to perform certain processing sequences for thereby carrying out the above process.

The data storage system according to the present invention can be used as a highly reliable data system to be added to a computer system.

The data storage system according to the present invention can also be used as a remote mirroring system for disaster contingency planning.

While preferred embodiments of the present invention have been described using specific terms, such description is for illustrative purposes only, and it is to be understood that changes and variations may be made without departing from the spirit or scope of the following claims.

What is claimed is:

1. A data storage system comprising:
    a first storage unit and a second storage unit for storing the same data received from a plurality of data transfer units, wherein the data and a command identifier corresponding to the data are sent to said first storage unit and said second storage unit concurrently and said first storage unit transmits the command identifier and an execution sequence representative of a sequence for storing the data received from said data transfer units, to said second storage unit,
    each of said first storage unit and said second storage unit receives the data for storage only from said plurality of data transfer units, and
    the execution sequence allows a first data transfer unit of said plurality of data transfer units and an other data transfer unit of said plurality of data transfer units to simultaneously transfer separately generated data to a same data area.

2. A data storage system comprising:
    a first storage unit and a second storage unit for storing the same data received from a plurality of data transfer units, wherein said first storage unit comprises:
    a main storage unit for storing the data received from said data transfer units and transmitting a command identifier received from said data transfer units and an execution sequence representative of a sequence for storing the data to-said second storage unit; and
    wherein said second storage unit comprises:
    an auxiliary storage unit for storing the data received from said data transfer units; and
    a temporary storage unit disposed at a front stage of said auxiliary storage unit, for temporarily storing the data received from said data transfer units and deciding the transferring sequence based on the command identifier received from said data transfer units and the command identifier received from said main storage unit and the execution sequence received from said main storage unit and transferring the temporarily stored data to said auxiliary storage unit according to the sequence,
    each of said first storage unit and said second storage unit receives the data for storage only from said plurality of data transfer units, and
    the execution sequence allows a first data transfer unit of said plurality of data transfer units and an other data transfer unit of said plurality of data transfer units to simultaneously transfer separately generated data to a same data area.

3. A data storage system according to claim 2, wherein said main storage unit and said temporary storage unit receive a write request from said data transfer units, keeps an area for storing the data, and transmits a data request to said data transfer units for thereby receiving data from said data transfer units.

4. A data storage system according to claim 2, wherein when said main storage unit receives a write request from said data transfer units, said main storage unit transmits an identifier of said write request and an execution sequence representative of a sequence in which said main storage unit has received said write request, as said execution sequence to said second storage unit; and
    said temporary storage unit also temporarily stores the write request received from said data transfer units, and transfers a write request and data corresponding to the identifier included in said execution sequence to said auxiliary storage unit according to a sequence based on the execution sequence included in said execution sequence received from said main storage unit.

5. A data storage system according to claim 2, wherein said temporary storage unit stores an execution sequence included in said execution sequence received from said main storage unit, in association with a write request corresponding to an identifier included in said execution sequence and the data, and when a preset condition is satisfied, repeats a process of transferring a write request and data to which an execution sequence for performing a next transfer is assigned to said auxiliary storage unit.

6. A data storage system according to claim 2, wherein when said main storage unit receives a write request from said data transfer units, said main storage unit transmits an identifier of said write request as said execution sequence to said second storage unit according to a sequence in which said main storage unit has received said write request; and
    said temporary storage unit temporarily stores the write request received from said data transfer units, and transfers a write request and data corresponding to an identifier included in said execution sequence to said auxiliary storage unit according to a sequence in which said temporary storage unit has received said execution sequence from said main storage unit.

7. A data storage system according to claim 6, wherein said temporary storage unit connects a write request and data corresponding to an identifier included in said execution sequence to the trailing end of a predetermined link according to a sequence in which said temporary storage unit has received said execution sequence from said main storage unit, stores the write request-and data connected to the trailing end of said predetermined link, and when a preset condition is satisfied, repeats a process of transferring a write request and data connected to the leading end of said predetermined link to said auxiliary storage unit, and a process of separating the transferred write request and data from said predetermined link.

8. A data storage device in a data storage system for storing data transmitted from a plurality of data transfer units, comprising:
    means for transmitting a command identifier corresponding to the data are sent and a sequence representative of a sequence for storing the data received from said data transfer units to another data storage device in said data storage system, wherein the data and the command identifier is transmitted from said plurality of data transfer units to said data storage device and said other data storage device concurrently, wherein each of said sata storage device and said other data storage device receives the data for storage only from said plurality of data transfer units, and the execution sequence allows a first data transfer unit of said plurality of data transfer units and an other data transfer unit of said plurality of data transfer units to simultaneously transfer separately generated data to a same data area.

9. A data storage device in a data storage system for storing data transmitted from a plurality of data transfer units, comprising:

a main storage unit for storing the data received from said data transfer units and transmitting the command identifier received from said data transfer units and said execution sequence representative of a sequence for storing the data to another data storage device in said data storage system, wherein the data is transmitted from said plurality of data transfer units to said data storage device and said other data storage device concurrently, wherein each of said main storage unit and said other data storage device receives the data for storage only from said plurality of data transfer units, and the execution sequence allows a first data transfer unit of said plurality of data transfer units and an other data transfer unit of said plurality of data transfer units to simultaneously transfer separately generated data to a same data area.

10. A data storage device according to claim 9, wherein said main storage unit receives a write request for data from said data transfer units, reserves an area in said main storage unit for storing the data, sends a data request to said data transfer units; and receives the data sent from said data transfer units.

11. A data storage device according to claim 9, wherein when said main storage unit receives a write request from said data transfer units, and said main storage unit transmits an identifier of said write request and an execution sequence representative of a sequence in which said main storage unit has received said write request, as said execution sequence to said other data storage device.

12. A data storage device according to claim 9, wherein when said main storage unit receives a write request from said data transfer units, and said main storage unit transmits an identifier of said write request as said execution sequence to said other data storage device according to a sequence in which said main storage unit has received the write request.

13. A data storage device in a data storage system for storing data transmitted from a plurality of data transfer units, comprising:

means for receiving a command identifier and an execution sequence representative of a sequence for storing the data received from said data transfer units through another data storage device in said data storage system, wherein the data and the command identifier is transmitted from said plurality of data transfer units to said data storage device and said other data storage device concurrently, wherein each of said first storage device and said other data storage device receives the data for storage only from said plurality of data transfer units, and the execution sequence allows a first data transfer unit of said plurality of data transfer units and an other data transfer unit of said plurality of data transfer units to simultaneously transfer separately generated data to a same data area.

14. A data storage device in a data storage system for storing data transmitted from a plurality of data transfer units, comprising:

an auxiliary storage unit for storing the data received from said data transfer units; and a temporary storage unit disposed at a front stage of said auxiliary storage unit, for temporarily storing the data received from said data transfer units and deciding a transferring sequence based on a command identifier received from said data transfer units and the command identifier received from said main storage unit and an execution sequence received from said main storage unit and transferring the temporarily stored data to said auxiliary storage unit according to the sequence based on said execution sequence received from another data storage device in the data storage system and representative of the sequence for storing the data received from said data transfer units in said other data storage device and said data transfer units transmit the data to said temporary storage unit and said other data storage device concurrently, wherein each of said main storage unit and said temporary storage unit receives the data for storage only from said plurality of data transfer units, and the execution sequence allows a first data transfer unit of said plurality of data transfer units and an other data transfer unit of said plurality of data transfer units to simultaneously transfer separately generated data to a same data area.

15. A data storage device according to claim 14, wherein said temporary storage unit receives a write request from said data transfer units, keeps an area for storing the data, and transmits a data request to said data transfer units for thereby receiving data from said data transfer units.

16. A data storage device according to claim 14, wherein said temporary storage unit also temporarily stores a write request received from said data transfer units, and, when said temporary storage unit receives an identifier of said write request received from said data transfer units by said other data storage device and an execution sequence representative of a sequence in which said temporary storage unit has received said write request, as said execution sequence from said other data storage device, said temporary storage unit transfers a write request and data corresponding to the identifier included in said execution sequence to said auxiliary storage unit according to a sequence based on the execution sequence included in said execution sequence.

17. A data storage device according to claim 14, wherein said temporary storage unit stores an execution sequence included in said execution sequence received from said other data storage device, in association with a write request corresponding to an identifier included in said execution sequence and the data, and when a preset condition is satisfied, repeats a process of transferring a write request and data to which an execution sequence for performing a next transfer is assigned to said auxiliary storage unit.

18. A data storage device according to claim 14, wherein said temporary storage unit also temporarily stores a write request received from said data transfer units, and, when said temporary storage unit receives an identifier of said write request as said execution sequence from said other data storage device according to a sequence in which the write request has been received from said data transfer units by said other data storage device, said temporary storage unit transfers a write request and data corresponding to the identifier included in said execution sequence to said auxiliary storage unit according to a sequence in which said temporary storage unit has received said execution sequence from said other data storage device.

19. A data storage device according to claim 18, wherein said temporary storage unit connects a write request and data corresponding to an identifier included in said execution sequence to the trailing end of a predetermined link according to a sequence in which said temporary storage unit has received said execution sequence from said other data storage device, stores the write request and data connected to the trailing end of said predetermined link, and when a preset condition is satisfied, repeats a process of transferring a write request and data connected to the leading end of said predetermined link to said auxiliary storage unit, and a process of separating the transferred write request and data from said predetermined link.

20. A method of storing the same data transmitted from a plurality of data transfer units in a first storage unit and a second storage unit, comprising the steps of:
transmitting the same data and a command identifier corresponding to the data from said plurality of data transfer units concurrently to said first storage unit and said second storage unit;
generating an execution sequence representative of a sequence for storing data successively transmitted from said data transfer units in said first storage unit; and
transmitting said execution sequence from said first storage unit to said second storage unit,
wherein each of said first storage unit and said second storage unit receives the data for storage only from said plurality of data transfer units, and
the execution sequence allows a first data transfer unit of said plurality of data transfer units and an other data transfer unit of said plurality of data transfer units to simultaneously transfer separately generated data to a same data area.

21. A method of storing the same data transmitted from a plurality of data transfer units in a main storage unit and an auxiliary storage unit, comprising the steps of:
transmitting the same data and a command identifier corresponding to the data from a plurality of data transfer units concurrently to said main storage unit and said temporary storage unit;
receiving the data transmitted from said data transfer units in said main storage unit and said temporary storage unit disposed at a front stage of said auxiliary storage unit;
generating an execution sequence representative of a sequence for storing data successively transmitted from said data transfer units in said main storage unit, and transmitting the command identifier and said execution sequence from said main storage unit to said temporary storage unit; and
temporarily storing the data transmitted from said data transfer units and deciding a transferring sequence based on the command identifier received from said data transfer units and the command identifier received from said main storage unit and the execution sequence received from said main storage unit in said temporary storage unit, and transferring the temporarily stored data from said temporary storage unit to said auxiliary storage unit according to the sequence based on the execution sequence received from said main storage unit,
wherein each of said main storage unit and said temporary storage unit receives the data for storage only from said plurality of data transfer units, and
the execution sequence allows a first data transfer unit of said plurality of data transfer units and an other data transfer unit of said plurality of data transfer units to simultaneously transfer separately generated data to a same data area.

22. A method according to claim 21, wherein said receiving step comprises the steps of, when a write request for data is transmitted from said data transfer units, keeping an area for storing the data in said main storage unit and said temporary storage unit, and then transmitting a data request from said main storage unit and said temporary storage unit to said data transfer units for thereby transmitting the data from said data transfer units.

23. A method according to claim 21, wherein said transmitting said execution sequence from said main storage unit to said temporary storage unit step comprises the steps of generating an identifier of a write request received from said data transfer units and an execution sequence representative of a sequence in which said write request has been received, as said execution sequence, and transmitting said execution sequence from said main storage unit to said temporary storage unit; and
wherein said transferring step comprises the steps of also temporarily storing the write request received from said data transfer units in said temporary storage unit, and transferring a write request and data corresponding to an identifier included in said execution sequence from said temporary storage unit to said auxiliary storage unit according to a sequence based on the execution sequence included in said execution sequence received from said main storage unit.

24. A method according to claim 21, wherein said transferring step comprises the step of storing an execution sequence included in said execution sequence received from said main storage unit in said temporary storage unit in association with a write request and data corresponding to an identifier included in said execution sequence, and when a preset condition is satisfied, repeating a process of transferring a write request and data to which an execution sequence for performing a next transfer is assigned from said temporary storage unit to said auxiliary storage unit.

25. A method according to claim 21, wherein said transmitting said execution sequence from said main storage unit to said temporary storage unit step comprises the step of transmitting an identifier of a write request as said execution sequence from said main storage unit to said temporary storage unit according to a sequence in which the write request has been received from said data transfer units; and
wherein said transferring step comprises the steps of also temporarily storing the write request received from said data transfer units in said temporary storage unit, and transferring a write request and data corresponding to an identifier included in said execution sequence from said temporary storage unit to said auxiliary storage unit according to a sequence in which said execution sequence has been received from said main storage unit.

26. A method according to claim 25, wherein said transferring step comprises the steps of connecting a write request and data corresponding to an identifier included in said execution sequence to the trailing end of a predetermined link according to a sequence in which said execution sequence has been received from said main storage unit, storing the write request and data connected to the trailing end of said predetermined link in said temporary storage unit, and when a preset condition is satisfied, repeating a process of transferring a write request and data connected to the leading end of said predetermined link from said temporary storage unit to said auxiliary storage unit, and a process of separating the transferred write request and data from said predetermined link.

27. A computer-readable recording medium storing a data storage program to be executed by a computer serving as a data storage system having a first storage unit and a second storage unit for storing the same data received from a plurality of data transfer units, wherein said data storage program comprising the steps of:
receiving the data and a command identifier transferred from said plurality of data transfer units concurrently at said first storage unit and said second storage unit;
generating an execution sequence representative of a sequence for storing data successively transmitted from said data transfer units in said first storage unit; and
transmitting the command identifier and said execution sequence from said first storage unit to said second storage unit,
wherein each of said first storage unit and said second storage unit receives the data for storage only from said plurality of data transfer units, and
the execution sequence allows a first data transfer unit of said plurality of data transfer units and an other data transfer unit of said plurality of data transfer units to simultaneously transfer separately generated data to a same data area.

28. A computer-readable recording medium storing a data storage program to be executed by a computer serving as a data storage system having a main storage unit and an auxiliary storage unit for storing the same data received from a plurality of data transfer units, wherein said data storage program comprising the steps of:
receiving the data transmitted and a command identifier corresponding to the same data from said data transfer units concurrently in said main storage unit and a temporary storage unit disposed at a front stage of said auxiliary storage unit;
generating an execution sequence representative of a sequence for storing data successively transmitted from said data transfer units in said main storage unit, and transmitting the command identifier and said execution sequence from said main storage unit to said temporary storage unit; and
temporarily storing the data transmitted from said data transfer units and deciding a transferring sequence based on the command identifier received from said data transfer units and the command identifier received from said main storage unit and the execution sequence received from said main storage unit in said temporary storage unit, and transferring the temporarily stored data from said temporary storage unit to said auxiliary storage unit according to the sequence based on said execution sequence received from said main storage unit,
wherein each of said main storage unit and said temporary storage unit receives the data for storage only from said plurality of data transfer units, and
the execution sequence allows a first data transfer unit of said plurality of data transfer units and an other data transfer unit of said plurality of data transfer units to simultaneously transfer separately generated data to a same data area.

29. A recording medium according to claim 28, wherein said receiving step comprises the steps of, when a write request for data is transmitted from said data transfer units, keeping an area for storing the data in said main storage unit and said temporary storage unit, and then transmitting a data request from said main storage unit and said temporary storage unit to said data transfer units for thereby transmitting the data from said data transfer units.

30. A recording medium according to claim 28, wherein said transmitting step comprises the steps of generating an identifier of a write request received from said data transfer units and an execution sequence representative of a sequence in which said write request has been received, as said execution sequence, and transmitting said execution sequence from said main storage unit to said temporary storage unit; and
wherein said transferring step comprises the steps of also temporarily storing the write request received from said data transfer units in said temporary storage unit, and transferring a write request and data corresponding to an identifier included in said execution sequence from said temporary storage unit to said auxiliary storage unit according to a sequence based on the execution sequence included in said execution sequence received from said main storage unit.

31. A recording medium according to claim 28, wherein said transferring step comprises the step of storing an execution sequence included in said execution sequence received from said main storage unit in said temporary storage unit in association with a write request and data corresponding to an identifier included in said execution sequence, and when a preset condition is satisfied, repeating a process of transferring a write request and data to which an execution sequence for performing a next transfer is assigned from said temporary storage unit to said auxiliary storage unit.

32. A recording medium according to claim 28, wherein said transmitting step comprises the step of transmitting an identifier of a write request as said execution sequence from said main storage unit to said temporary storage unit according to a sequence in which the write request has been received from said data transfer units; and
wherein said transferring step comprises the steps of also temporarily storing the write request received from said data transfer units in said temporary storage unit, and transferring a write request and data corresponding to an identifier included in said execution sequence from said temporary storage unit to said auxiliary storage unit according to a sequence in which said execution sequence has been received from said main storage unit.

33. A recording medium according to claim 32, wherein said transferring step comprises the steps of connecting a write request and data corresponding to an identifier included in said execution sequence to the trailing end of a predetermined link according to a sequence in which said execution sequence has been received from said main storage unit, storing the write request and data connected to the trailing end of said predetermined link in said temporary storage unit, and when a preset condition is satisfied, repeating a process of transferring a write request and data connected to the leading end of said predetermined link from said temporary storage unit to said auxiliary storage unit, and a process of separating the transferred write request and data from said predetermined link.

* * * * *